(12) United States Patent
Rump

(10) Patent No.: US 12,518,466 B2
(45) Date of Patent: Jan. 6, 2026

(54) GENERATING A DESTINATION TEXTURE FROM A PLURALITY OF SOURCE TEXTURES

(71) Applicant: X-RITE EUROPE GMBH, Regensdorf (CH)

(72) Inventor: Martin Rump, Winderscheid (DE)

(73) Assignee: X-RITE EUROPE GMBH, Regensdorf (CH)

( * ) Notice: Subject to any disclaimer, the term of this patent is extended or adjusted under 35 U.S.C. 154(b) by 157 days.

(21) Appl. No.: 18/014,991

(22) PCT Filed: Jul. 7, 2021

(86) PCT No.: PCT/IB2021/056086
§ 371 (c)(1),
(2) Date: Jan. 6, 2023

(87) PCT Pub. No.: WO2022/009110
PCT Pub. Date: Jan. 13, 2022

(65) Prior Publication Data
US 2023/0260193 A1  Aug. 17, 2023

(30) Foreign Application Priority Data
Jul. 7, 2020 (EP) .................................... 20184561

(51) Int. Cl.
*G06T 15/04* (2011.01)
*G06T 5/50* (2006.01)
(Continued)

(52) U.S. Cl.
CPC ................ *G06T 15/04* (2013.01); *G06T 5/50* (2013.01); *G06T 5/70* (2024.01); *G06T 15/10* (2013.01);
(Continued)

(58) Field of Classification Search
None
See application file for complete search history.

(56) References Cited

U.S. PATENT DOCUMENTS

| 6,697,062 B1 * | 2/2004 | Cabral | G06T 15/205 |
| | | | 345/646 |
| 7,324,116 B2 * | 1/2008 | Boyd | G06T 15/04 |
| | | | 345/428 |

(Continued)

FOREIGN PATENT DOCUMENTS

| EP | 2833327 | 10/2018 |
| WO | 2020200982 | 10/2020 |
| WO | 2022002676 | 1/2022 |

OTHER PUBLICATIONS

Yu et al., "Texture Mixer: A Network for Controllable Synthesis and Interpolation of Texture", 2019 (Year: 2019).*

(Continued)

*Primary Examiner* — Hilina K Demeter
(74) *Attorney, Agent, or Firm* — Hahn Loeser & Parks, LLP

(57) ABSTRACT

A computer-implemented method for generating a destination texture (201) from at least two source textures (211, 221, 231) comprises carrying out a statistical texture synthesis operation. An interpolation weight is assigned to each of the source textures (, and the destination texture is synthesized using the source textures and the assigned interpolation weights. Synthesizing the destination texture comprises randomly choosing one of the source textures, randomly extracting a texture patch (212) from the chosen source texture (211), modifying the extracted texture patch in such a manner that at least one statistical property (215) of the modified texture patch (214) approximates a corresponding averaged statistical property (202), and inserting the modified texture patch into the destination texture so that (Continued)

the modified texture patch seamlessly fits to existing texture content (203) in the destination texture.

19 Claims, 11 Drawing Sheets

(51) Int. Cl.
*G06T 5/70* (2024.01)
*G06T 15/10* (2011.01)
*G06T 15/50* (2011.01)

(52) U.S. Cl.
CPC .. *G06T 15/506* (2013.01); *G06T 2207/20221* (2013.01)

(56) References Cited

U.S. PATENT DOCUMENTS

| | | | | |
|---|---|---|---|---|
| 7,782,334 | B1* | 8/2010 | Kilgard | G06T 1/00 345/592 |
| 8,872,811 | B1 | 10/2014 | Rump et al. | |
| 11,130,297 | B2* | 9/2021 | Wolfe | C09J 7/20 |
| 2002/0122043 | A1* | 9/2002 | Freeman | G06T 15/04 345/582 |
| 2004/0041816 | A1* | 3/2004 | Yamauchi | G06T 15/04 345/582 |
| 2004/0227766 | A1* | 11/2004 | Chou | G06T 15/04 345/582 |
| 2005/0128484 | A1 | 6/2005 | Rodrigues et al. | |
| 2007/0097119 | A1 | 5/2007 | Steenhoek et al. | |
| 2007/0291993 | A1 | 12/2007 | Nisper et al. | |
| 2008/0235224 | A1 | 9/2008 | Joseph Rodrigues et al. | |
| 2008/0291449 | A1 | 11/2008 | Rodrigues et al. | |
| 2018/0012407 | A1* | 1/2018 | Chuang | G06T 13/40 |
| 2019/0019323 | A1* | 1/2019 | Fielding | G06T 15/04 |
| 2020/0089991 | A1 | 3/2020 | Steenhoek et al. | |

OTHER PUBLICATIONS

Golla Tim et al: "An Efficient Statistical Data Representation for Real-Time Rendering of Metallic Effect Car Paints", Dec. 7, 2017 (Dec. 7, 2017). Big Data Analytics in the Social and Ubiquitous Context .. 5th International Workshop on Mode LI NG Social Media, MSM 2014, 5th International Workshop on Mining Ubiquitous and Social Environments, Muse 2014 And First International Workshop on Machine LE, XP047456181.

Xinguo Liu et al: "Synthesizing bidirectional texture functions for real-world surfaces", Computer Graphics. SIGGRAPH 2001. Conference Proceedings. Los Angeles, CA, Aug. 12-17, 2001; [Computer Graphics Proceedings. SIGGRAPH], New York, NY ACM, US, Aug. 2001 (Aug. 2001), pp. 97-106, XP058253429.

Olga Diamant! et al: "Synthesis of Complex Image Appearance from Limited Exemplars", ACM Transactions on Graphics, ACM, NY, US, vol. 34, No. 2, Mar. 2, 2015 (Mar. 2, 2015), pp. 1-14, XP058065793.

Li Yijun et al: "Diversified Texture Synthesis with Feed-Forward Networks", IEEE Conference on Computer Vision and Pattern Recognition (CVPR 2017), [Online] Jul. 2017 (Jul. 2017), pp. 266-274, XP055846364.

Yu Ning et al: "Texture Mixer: A Network for Controllable Synthesis and Interpolation of Texture", 2019 IEEE/CVF Conference on Computer Vision and Pattern Recognition (CVPR), IEEE, Jun. 15, 2019 (Jun. 15, 2019), pp. 12156-12165, XP033687195.

Vivek Kwatra et al: "Graphcut textures", ACM Transactions on Graphics, ACM, NY, US, vol. 22, No. 3, Jul. 2003 (Jul. 2003), pp. 277-286, XP058249521.

Alexei A Efros et al: "Image quilting for texture synthesis and transfer", Computer Graphics. SIGGRAPH 2001. Conference Proceedings. Los Angeles, CA, Aug. 12-17, 2001; [Computer Graphics Proceedings. SIGGRAPH], New York, NY : ACM, US, Aug. 2001 (Aug. 2001), pp. 341-346, XP058253454.

Tim Golla et al: "Interactive Interpolation of Metallic Effect Car Paints", Jan. 2018 (Jan. 2018), page Modeling and Visualization, XP055761530.

International Search Report regarding PCT/IB2021/056086, mailed Oct. 12, 2021 (5 pgs.).

Written Opinion of the International Searching Authority regarding PCT/IB2021/056086, mailed Oct. 12, 2021 (9 pgs.).

"Photo-realistic Rendering of Metallic Car Paint from Image-Based Measurements," Martin Rump et al., Eurographics 2008, vol. 27 (2008), No. 2 (10 pgs.).

Martin Rump, Ralf Sarlette, Richard Klein: "Efficient Resampling, Compression and Rendering of Metallic and Pearlescent Paint", Institute for Computer Science II, Proceedings of Vision, Modeling, and Visualization, (20091100), pp. 11-18.

* cited by examiner

GENERATING A DESTINATION TEXTURE FROM A PLURALITY OF SOURCE TEXTURES

CROSS-REFERENCE TO RELATED APPLICATIONS

The present application is a US National Phase of International Patent Application serial number PCT/IB2021/056086, filed Jul. 7, 2021, entitled "GENERATING A DESTINATION TEXTURE FROM A PLURALITY OF SOURCE TEXTURES," currently pending; which claims the benefit of European Regional Application Number 20184561.7, filed Jul. 7, 2020, entitled "GENERATING A DESTINATION TEXTURE FROM A PLURALITY OF SOURCE TEXTURES,".

TECHNICAL FIELD

The present invention relates to improvements in the rendering of virtual objects based on limited measurements of appearance from actual objects. In particular, the present invention relates to a method of generating a destination texture from a plurality of source textures. The invention further relates to a device for carrying out such a method and to a corresponding computer program.

PRIOR ART

Using a computer to photo-realistically render a virtual object requires knowing more than the object's shape and innate color. The rendering operation should ideally reproduce the visual impression of an actual material comprised in the object in an environment under defined illumination and viewing conditions. This is referred to by persons of skill in the art as "appearance". Appearance may include color and texture. Both color and texture may appear differently depending on illumination conditions and viewing conditions. An appearance model can be used to describe the appearance of a material or object under arbitrary illumination and viewing conditions, that is, the model can be used to describe a wide range of illumination types (ray, diffuse), viewing angles relative to illumination angles, and object orientation.

An "appearance model" is a formal construct that describes appearance in mathematical terms, using a plurality of material-dependent parameters called "appearance attributes". The appearance model offers a mathematical description of appearance in such a form and at such a level of completeness that it is possible to visualize (i.e., render and display) an object having arbitrary three-dimensional shape under arbitrary illumination and viewing conditions.

In simple embodiments, an appearance model describes only the dependence of color on the illumination and viewing conditions, without considering spatial variations of appearance across a surface of an object. For instance, in simple embodiments, an appearance model may be a BRDF model, which describes spectral reflectance as a function of illumination and viewing directions only, without considering spatial variations. In more sophisticated embodiments, the appearance model may be a model that includes "texture", i.e., spatial variations of appearance across the surface of the object, in addition to the angular dependence of reflectance and/or transmission. In particular, the appearance model may be a Spatially Varying Bidirectional Reflectance Distribution Function ("SVBRDF") model, a Bidirectional Texture Function ("BTF") model, a Bidirectional Surface Scattering Distribution Function ("BSSRDF model"), a specialized model for car paints etc. Many such models are known in the art. Accordingly, the appearance attributes used in the appearance model may include both color attributes and texture attributes.

Texture, understood in the broad sense of describing spatial variation of appearance across the surface of an object, may strongly depend on the illumination and viewing directions relative to the object. For instance, in metallic effect paints, which typically contain highly reflecting flakes, the surface positions where strong reflectance is observed can change non-continuously when the illumination and/or viewing directions are continuously changed because flakes at different positions across the surface or within the paints will reflect differently and at different proportions at different combinations of illumination and viewing directions.

As noted above, the appearance model may comprise a description of texture, with associated texture attributes. Texture attributes may include image data that indicate texture in a certain surface region or data that may have been derived from image data, such as a height map or normal map, a coarseness value, a sparkle distribution etc., in an arbitrary parameterization. In the case of an appearance model that is appropriate for describing the appearance of metallic and pearlescent effect paints, the texture information may, for instance, take the form of one or more images of a representative surface portion of a paint coating, the texture attributes being pixel values in the images.

There may be a need to predict the appearance of an object for which only some appearance attributes are known. In particular, color and appearance measurement devices typically have a limited set of measurement geometries, in particular, a limited set of combinations of illumination and viewing angles. For example, a handheld imaging spectrophotometer may have three to eleven illumination angles, two spectrophotometer observation angles, and one texture camera observation angle. In such examples, texture attributes may be known for only a very limited, "sparse" set of illumination and viewing directions, whereas reliable prediction of appearance may require that texture be predicted for a "dense" range of illumination and viewing directions. For example, to simulate rotating a virtual object (e.g., change viewing angle), a prediction of texture at viewing angles not captured by the measurement device will be required. There is therefore a need to model the texture of a material for an arbitrary set of "destination" illumination and viewing directions based on known textures at only a few predetermined "source" illumination and viewing directions.

Existing methods have so far addressed this problem only partially, see, e.g. [RMS+08] and [RSK09].

US20070097119A1 discloses a method for displaying a simulated paint coating on a display device. RGB color values are calculated over a range of aspecular angles. A statistical texture function of the paint coating is determined. The statistical texture function is applied to the RGB values, and color pixels are displayed using these values. The statistical texture function does not depend on illumination and viewing directions.

US20050128484A1 discloses a method for determining a color-matched repair paint formula. Color characteristics of a target color to be matched are identified, inputted, and processed in such way as to enable a visual display of the target color. Alternate colors are selected from a database. An alternate color may be displayed on the display in several virtual chips, each virtual chip representing a different viewing angle, or as a curved panel. Images showing flake appearance characteristics may be superimposed with the color. The virtual chips may be viewed in combination with the target color. Color and images obtained for a plurality of aspecular angles may be interpolated to show the change in flake appearance as aspecular angle changes. The document is silent about how color and flake appearance are interpolated.

US20080291449A1 and US20080235224A1 both disclose methods for displaying images to select a matching formula to match the appearance of an article such as a target coating of a vehicle. In one embodiment, color data of the article is obtained using a colorimeter or spectrophotometer. Texture data of the article is obtained using an imaging device. A target image is created based on the color and texture data, and the target image is displayed on a display device. A preliminary matching formula is manually retrieved from a database. A matching image is generated for the preliminary matching formula. The matching image is displayed on the display device side by side with the target image. The target image and the matching image may be displayed for multiple aspecular angles. The documents are silent about how texture data is generated and displayed for the multiple aspecular angles.

US20200089991A1 discloses a system for displaying one or more images to select one or more matching formulas to match appearance of a target coating of an article. A first database contains repair formulas and associated appearance characteristics. A second database contains identification information or three-dimensional geometric data of at least one article. A preliminary matching formula is retrieved from the first database, an article or its three-dimensional geometric data is selected from the second database, and a marked section of the surface of the article is received. Individual matching images containing the marked section and an unmarked section adjacent to the marked section are generated, and the individual matching images are displayed on a display device. In the marked section, the individual matching images are generated based on the appearance characteristics of the preliminary matching formula. In the unmarked section, the individual matching images are generated based on the appearance characteristic of the article. The appearance characteristics are computed from images acquired from the article using an imaging device. The appearance characteristics may comprise texture, metallic or pearlescent effect, gloss, distinctness of image, flake appearances such as texture, sparkle, glint and glitter, and enhancement of depth perception imparted by the flakes. The document does not specify in which manner the appearance of the article is displayed for different illumination and viewing directions.

U.S. Pat. No. 8,872,811 B1 discloses a method of digitally generating data indicative of a synthesized appearance of a simulated material having physically plausible appearance attributes. A set of data indicative of the synthesized appearance of the simulated material is determined based in part on data associated with a physically tangible source material and in part on data of measured attributes of a physically tangible reference material.

US 2007291993A1 discloses an apparatus for measuring a spatially under-sampled Bidirectional Reflectance Distribution Function (BRDF) of a surface.

Related problems arise in the prediction and visualization of the texture of a composite material that comprises multiple constituents, including one or more effect pigments. While for any given measurement geometry the texture of the composite material somehow reflects the texture attributes of each constituent of the mixture, it is notoriously difficult to realistically predict and visualize the texture of such a composite material.

SUMMARY OF THE INVENTION

It is an object of the present invention to provide a method that enables a realistic prediction of the texture of a material, i.e., of the spatial variation of its appearance, for an arbitrary combination of illumination and viewing directions, assuming that the texture of the material is known only for a limited set of combinations of illumination and viewing directions, or for a mixture of two or more constituents, including one or more effect pigments. In particular, it is an object of the present invention to provide a method that provides a realistic prediction of the appearance of metallic and pearlescent effect paints for arbitrary illumination and viewing directions and/or for arbitrary composition, even if the appearance strongly changes for small changes of these directions.

Accordingly, a computer-implemented method for generating a destination texture from at least two source textures is provided. The method comprises carrying out a statistical texture synthesis operation comprising:
 (i) assigning an interpolation weight to each of the source textures, based on the destination coordinates and the source coordinates; and
 (ii) synthesizing a destination texture using the source textures and the assigned interpolation weights.

Synthesizing the destination texture comprises the following steps:
 (a) randomly choosing one of the source textures with a probability proportional to its interpolation weight;
 (b) randomly extracting a texture patch from the chosen source texture, the texture patch being a portion of the source texture;
 (c) modifying the extracted texture patch by modifying pixel values in the extracted texture patch to obtain a modified texture patch, modification of the pixel values being carried out in such a manner that at least one statistical property of the modified texture patch approximates a corresponding averaged statistical property, the averaged statistical property being determined by carrying out a weighted average over the source textures, weighted by the interpolation weights;
 (d) inserting the modified texture patch into the destination texture so that the modified texture patch seamlessly fits to texture content that is already present in the destination texture; and
 (e) repeating steps (a)-(d) until the destination texture is completely filled.

Each source texture and each destination texture may be represented by two-dimensional image data in the form of an array of pixels, each pixel having a pixel value representative of reflectance at the location of the pixel. The sizes of the source and destination textures do not need to be identical. The spatial variations may be representative, e.g., of the effects of an effect pigment in a material, the effect pigment creating a sparkle effect.

By carrying out the statistical texture synthesis operation of the present invention, a destination texture is created that has similar statistical properties as the source textures while being dissimilar, on a pixel-by-pixel basis, to any of the source textures and to other destination textures. This mimics the properties of a metallic effect paint.

Each texture patch is to be understood to be a continuous part of the source texture from which it has been extracted, i.e., a continuous image patch that has been cut out from the source texture. Each texture patch may have arbitrary shape. Rectangular shape, in particular, quadratic shape, is preferred. Each texture patch preferably has an edge length that corresponds to at least twice the size of the largest effect pigment (e.g., the largest reflective flakes) in the paint that is being modeled. On the other hand, preferably each texture patch has an area that is not larger than 10% of the area of the respective source texture.

The texture patches are extracted randomly, i.e., the position of each extracted texture patch in the chosen source texture is determined randomly, preferably with constant weight over the area of the source texture. By randomly extracting texture patches it is ensured that the resulting destination textures at different destination coordinates are dissimilar.

Each of the source textures may be representative of spatial variation of the reflectance properties of a material for a particular combination of illumination and viewing directions.

Also the destination texture may be representative of spatial variations of the reflectance properties of the material for the same or a different combination of illumination and viewing directions.

In some embodiments, the present invention is employed to synthesize a destination texture that is associated with a particular measurement geometry, based on source textures that have been recorded with different measurement geometries. In such embodiment, the destination texture may be associated with a set of destination coordinates, the set of destination coordinates being indicative of a particular combination of illumination and viewing directions for which the destination texture indicates spatial variations of appearance, and each source texture may be associated with a different set of source coordinates, each set of source coordinates being indicative of a combination of illumination and viewing directions for which the corresponding source texture indicates spatial variations of appearance. In particular, each set of source and destination coordinates may be a set of two or more angular coordinates. The source and destination coordinates do not need to directly indicate illumination and viewing directions in a reference frame determined by a surface of a material. Instead they may be derived from these directions by a suitable transformation. In particular, the source coordinates and/or destination coordinates may be expressed in a Rusinkiewicz parameterization [Rus98]. In particular, each set of source or destination coordinates may comprise or consist of the polar angles in the Rusinkiewicz parameterization.

In such embodiments, assigning an interpolation weight to each of the source textures may comprise the following procedure:
creating a Delaunay triangulation of the sets of source coordinates;
finding a simplex in the Delaunay triangulation that contains the destination coordinates, the found simplex having a plurality of corners; and
using, as the interpolation weights for the source textures at the corners of the found simplex, barycentric coordinates of the destination coordinates with respect to the found simplex.

The interpolation weights for the source textures outside the found simplex are preferably set to zero, i.e., source textures outside the found simplex are not used for synthesizing the destination texture.

In other embodiments, the destination texture is indicative of spatial variations of appearance of a composite material that comprises at least two constituents according to a recipe that defines concentrations of each constituent in the composite material, each source texture is associated with one of said constituents, and the interpolation weights are assigned to the source textures according to the concentrations of the constituents as defined by the recipe.

These embodiments may also be combined, i.e., the method may consider source textures for a plurality of constituents, the source textures for each constituent being associated with a plurality of sets of source coordinates, and the destination texture may be associated with a composite material that comprises the constituents and is indicative of appearance at a set of destination coordinates that is different from the sets of source coordinates. In such embodiments, the interpolation weights will be assigned according to both the concentrations of the constituents and to the destination coordinates relative to the source coordinates.

If the destination texture is associated with a composite material, the method may comprise generating an adjusted destination texture by additionally adjusting pixel values in the destination texture to correct for effects of absorption and scattering in the composite material. The pixel values may be adjusted in such a manner that at least one statistical property of the adjusted destination texture matches a benchmark property of the composite material. In particular, the pixel values may be adjusted in such a manner that average color space values of the adjusted destination texture match benchmark color space values of the composite material, the color space values and benchmark color space values preferably being expressed in a perceptual color space.

If the destination texture is indicative of the spatial variations of appearance of the composite material for a particular combination of illumination and viewing directions, and if benchmark color space values are not available for this particular combination, the method may comprise fitting parameters of a BRDF model to available benchmark colors at a plurality of other combinations of illumination and viewing directions, and evaluating the BRDF model at said particular combination to obtain the benchmark color space values for that particular combination.

In alternative embodiments, in order to correct for the effects of absorption and scattering in a composite material, the method may comprise:
obtaining individual optical parameters that at least approximately describe a scattering and absorption behavior of each constituent in the composite material;
determining combined optical parameters that describe a scattering and absorption behavior of the composite material, based on the concentrations of the constituents and their individual optical parameters;
carrying out an optical simulation of light flux within the composite material for at least one layer below a surface of said composite material to determine attenuation factors of incident and reflected light for effect pigments in said layer; and
adjusting pixel values of the destination texture based on said attenuation factors.

Returning to statistical texture synthesis, in preferred embodiments, the statistical property for which an approximate match is desired is a pixel value histogram. A pixel value histogram is a dataset that comprises, for each of a plurality of ranges of brightness values that may be present in an image, an indicator of the relative frequency of that range in the image. Pixel value histograms are widely used in digital image processing for visualizing properties like contrast and brightness of digital images. Their generation from the image data and their interpretation is well known in the art.

The modification of the pixel values preferably comprises applying a point-wise transformation to the pixel values, i.e., a transformation that is applied on each pixel value individually, the point-wise transformation being monotonically non-decreasing. In this manner it is ensured that pixel values that were identical before modification are still identical after modification, and that relative brightness orders of pixels do not change, i.e., a pixel value that was brighter than another pixel value before modification of the texture patch will not be darker than the other pixel value after the modification. Suitable transformation functions are well known in the art of digital image processing. In particular, histogram matching algorithms for determining a transformation function that will cause the histogram of an image to match the histogram of another image are well known in the art.

Inserting the modified texture patch into the destination texture so that it seamlessly fits to the texture content that is already present in the destination texture can be achieved by using techniques like Graphcut/MinCut [Kw03] that are well known in the art. In these techniques, a seam that enforces visual smoothness between the existing texture content and the newly placed patch is computed. The texture patch and the texture content that is already present are stitched together along this seam.

The method may further comprise visualizing the destination texture using a display device.

The display device may be a screen, e.g., an LCD screen, a projector or any other type of display device as they are well known in the art. If the display device comprises a screen, the screen may be touch-sensitive, as it is well known in the art. The display device may be capable of creating a 3D impression, as it is well known in the art. For instance, the display device may be a VR headset or a 3D display.

The destination texture generated by the proposed method may be an entry in a discrete texture table of an appearance model. Accordingly, the method may comprise generating an instance of an appearance model, the appearance model comprising a discrete texture table comprising a plurality of destination textures, each destination texture associated with a different set of destination coordinates, wherein at least one of the destination textures in the discrete texture table is generated by carrying out the statistical texture synthesis operation. In other words, the present disclosure provides a computer-implemented method for generating an instance of an appearance model, the appearance model comprising a discrete texture table having a plurality of entries in the form of destination textures, each entry being associated with a different set of destination coordinates, wherein at least one of the entries of the discrete texture table is determined based on a plurality of source textures, each source texture associated with a different set of source coordinates, by carrying out a statistical texture synthesis operation.

The appearance model may comprise, in addition to the discrete texture table, a monochromatic brightness BRDF model for describing angular dependence of overall reflection properties, averaged over surface position and wavelengths. Generating an instance of the appearance model of the material may then comprise determining the parameters of the brightness BRDF model. This may be carried out using known, generic BRDF fitting algorithms.

The appearance model may further comprise a discrete color table having a plurality of entries in the form of color values, each entry being associated with a particular set of coordinates, each set of coordinates being indicative of lighting and viewing directions under which the material is viewed. The color values can be expressed in an arbitrary color space, e.g. a trichromatic color space like RGB or CIEXYZ, or any other color space like CIELAB (L*a*b*), or in the form of spectral data representative of a spectral response of a material to incident light, in arbitrary format. Generating an instance of the appearance model may then comprise at least one of the following operations:
  (i) determining entries of the discrete color table by interpolating between available color attributes at different combinations of illumination and viewing directions; and/or
  (ii) determining entries of the discrete color table by extrapolating from available color attributes at different combinations of illumination and viewing directions.

Instead of a monochromatic BRDF model in combination with a color table, in alternative embodiments, the appearance model may comprise any other kind of model for describing angular dependence of brightness and color. For instance, the appearance model may comprise a trichromatic BRDF model which individually models angular dependence of reflection properties for each of three different color channels in a trichromatic color space like CIEXYZ or RGB, or which models angular dependence of L*a*b* values in the CIELAB color space.

The appearance model may further include a model of the effects of a clear coating layer on top of an opaque of translucent paint layer.

The method may further comprise visualizing, using a display device, a scene comprising a virtual object, wherein at least a portion of the virtual object is visualized using the generated instance of the appearance model.

The geometry of the virtual object may be defined by a three-dimensional geometric model. The geometric model defines a three-dimensional macroscopic surface geometry of the virtual object. Preferably the macroscopic surface geometry is curved along at least two mutually orthogonal directions. In some embodiments, a combination of small polygonal planar surfaces (e.g., a polygon mesh) may be used in the geometric model to represent a curved surface of the virtual object. Preferably the curved three-dimensional macroscopic surface geometry comprises both convex and concave portions. Preferably the macroscopic surface geometry of the virtual object has surface normals covering a large solid angle, i.e., having a large range of directions in three-dimensional space. Preferably the solid angle covered by the directions of the surface normals of the virtual object is at least 50% of the solid angle of a hemisphere, i.e., it is preferably at least $1\pi$ sr. In this manner, effects like color shift, gloss, sparkle, texture etc. can be visualized for a large number of illumination and viewing directions relative to the surface normals of the virtual object. In particular, the illumination and viewing directions relative to the surface normals of the virtual object for which the virtual object is visualized may be different from the illumination and viewing directions represented by the source coordinates.

The appearance model may be employed for visualizing the appearances of at least two materials in such a manner that a user can determine with improved confidence whether the appearances of the materials match, without a need of producing physical samples. To this end a method is proposed which comprises:
  obtaining a first instance of the appearance model, the first instance being indicative of an appearance of a first material;

obtaining a second instance of the appearance model, the second instance being indicative of an appearance of a second material; and obtaining a geometric model of the at least one virtual object, the geometric model defining a three-dimensional macroscopic surface geometry of the at least one virtual object;

visualizing, using the display device, a scene comprising the virtual object, using the first and second sets of appearance attributes and the geometric model, together with a virtual separating element, wherein the virtual object has first and second portions that are adjacent to each other, the first and second portions being visually separated by the virtual separating element in such a manner that the first and second portions appear to meet where the virtual separating element is located, wherein the first portion of the virtual object is visualized using the first instance of the appearance model, and wherein the second portion of the virtual object is visualized using the second instance of the appearance model.

In other words, the instances of the appearance model of the first and second materials serve as a basis for visualizing (i.e., rendering and displaying) an arbitrary three-dimensional virtual object, wherein different portions of the object are visualized side-by-side using the instances of the appearance model for the first and second materials, respectively, separated by a virtual separating structure. In this manner, a direct comparison of the appearances of the first and second materials is facilitated.

In preferred embodiments, the display device displays the visualization of the virtual object as a two-dimensional projection in a two-dimensional viewing plane. In this case, the virtual separating element may be a simple line in the viewing plane, in particular, a straight line.

The method may comprise moving the virtual separating element relative to the virtual object. This can be done interactively, i.e., in response to user input, e.g., in response to a user moving a pointing device like a mouse or trackpad, in response to a user hitting a key on a keyboard, or in response to a user sweeping a finger or a pointing device like a digital pencil across a touch screen. When the virtual separating element is moved, the first and second portions are permanently redefined in such a manner that the first and second portions still appear to meet where the virtual separating element is located when the virtual separating element is moved. In this manner the user may visually assess how the appearance of the virtual object changes in a selected region of the virtual object when the material of the virtual object changes.

In some embodiments, the scene is visualized with some defined illumination conditions, which may be described, e.g., by an environment map, as it is well known in the art. The method may optionally comprise changing the illumination conditions in response to user input, in particular, one or more illumination directions or the type of illuminant, i.e., the spectral properties of the light used for illumination, and visualizing the scene with the changed illumination conditions to facilitate comparison of the appearances of the first and second materials under different illumination conditions.

In some embodiments, the virtual object is visualized in a defined pose (e.g., orientation, position, size, and distance from viewpoint), and the method comprises changing the pose of the virtual object in response to user input, i.e., rotating, moving or rescaling the virtual object, and visualizing the virtual object in the pose that is assumes after the change in pose. Thereby differences in appearance that subtly depend on the directions of illumination and viewing can be better discerned. Visualization can be carried out in the form of a video that visualizes the virtual object being continuously rotated. The method may further comprise changing shape of the virtual object.

The instances of the appearance model for the first and/or second materials may be generated from a limited set of available appearance attributes associated with each material. The values of this limited set may have been measured or obtained in some other way, e.g., by calculations or database retrieval. The appearance model may generally require many more appearance attributes than the limited set that is actually available, and it may require different types of appearance attributes than those available. In particular, the set of appearance attributes required by the appearance model may have greater cardinality (i.e., contain a larger number of appearance attributes) than the limited set of available appearance attributes. In other words, the set of available appearance attributes may be sparse in comparison to the denser set of appearance attributes required by the appearance model. Mathematical operations, which may involve transformations, fitting operations and/or inter- and extrapolations, may be necessary to generate an instance of the appearance model from the limited set of available appearance attributes. For instance, the limited set of available appearance attributes may contain color attributes, e.g., in the form of trichromatic or spectral data, for only a limited number of combinations of illumination and viewing directions. The limited set of available appearance attributes may further comprise texture attributes, e.g. in the form of image data, for only one combination or a limited number of combinations of illumination and viewing directions. In contrast, the appearance model may describe reflectance and/or transmission as a function of angles and position in a different form. In particular, the appearance model may require spectral data and/or texture data for a much larger number of pairs of illumination and viewing directions than those that are available, and the required illumination and viewing directions may be different from those that are available.

In some embodiments, the values of the limited set of available appearance attributes of the first material are determined by carrying out measurements on a target object comprising the first material, using a (first) appearance capture device, and the first instance of the appearance model is generated from this limited set of appearance attributes. The first material may in this case also be called a "target material".

In some embodiments, the second material is a candidate material that is expected to have a similar appearance as the first material. The second instance of the appearance model may accordingly be generated based on candidate appearance attributes associated with the candidate material. In some embodiments, the candidate material is a known reference material, and the candidate appearance attributes are appearance attributes associated with the known reference material. In other embodiments, the candidate material is composed of a plurality of constituent materials, and appearance attributes may be available for a plurality of reference materials that comprise the constituent materials of the candidate material. Accordingly, the candidate appearance attributes can be based on predetermined appearance attributes associated with a plurality of reference materials, using calculations. The recipe may be determined in such a manner that the candidate material has expected appearance attributes that at least approximately match the appearance attributes of the target material. In particular, the presently proposed method may comprise a step of determining the recipe. This may involve minimizing a difference measure between expected appearance attributes of the candidate material and the measured appearance attributes of the target material. Suitable difference measures and optimization algorithms are well known in the art of color formulation.

In particular, obtaining the second instance of the appearance model may comprise:

receiving appearance attributes of the first material;

determining a recipe of the second material based on the received appearance attributes of the first material and predetermined appearance attributes associated with the reference materials; and generating the second instance of the appearance model based on the recipe and the measured appearance attributes associated with the reference material.

The appearances of a first material whose appearance attributes have been determined by measurements and of a second material whose appearance attributes have been determined by formulation software may be visualized side by side in another manner than by displaying a single object having two portions separated by a virtual separating element. Accordingly, the presently proposed method may comprise:

determining a set of measured appearance attributes of a first material by carrying out measurements on a target object that comprises the first material, using a first appearance capture device;

generating a first instance of an appearance model based on the set of measured appearance attributes of the first material;

determining a recipe of a second material based on the measured appearance attributes of the first material and on predetermined appearance attributes associated with one or more reference materials;

generating a second instance of the appearance model based on the recipe and the measured appearance attributes associated with the reference materials; and visualizing, using a display device, a scene comprising at least one virtual object, a first portion of the scene being visualized using the first instance of the appearance model, and a second portion of the scene being visualized using the second instance of the appearance model.

For instance, the scene may comprise two identically shaped virtual objects that are visualized side by side in identical orientations, one of them being visualized using the first instance and the other one being visualized using the second instance of the appearance model.

By enabling a direct comparison of two portions of a scene, the portions being rendered using the first and second instances of the appearance model, the method enables a reliable prediction whether the second material according to the recipe has an appearance that matches the appearance of the first material in the target object.

In some embodiments, the method further comprises obtaining a physical, tangible trial object that comprises the candidate material, e.g., by producing the trial object. The method may comprise determining measured appearance attributes of the trial object by carrying out measurements on the trial object, using an appearance capture device. The method may further comprise visualizing at least a portion of the at least one virtual object using the measured appearance attributes of the trial object. In this manner, the appearance of the trial object can be compared to the appearance of the target object even if the target object is not present at the same location as the trial object. In addition or in the alternative, the method may comprise determining an amended recipe, using the measured appearance attributes of the trial object and the calculated appearance attributes of the candidate material. Suitable algorithms for determining an amended recipe once the measured appearance attributes of the trial object are available are well known in the art of color formulation. Such algorithms are often called "correction algorithms". The method may then be repeated with the amended recipe.

If a second appearance capture device is used, the device is preferably configured to determine the same types of appearance attributes under the same pairs of illumination and viewing directions as the first appearance capture device. However, it is also conceivable that the second appearance capture device is configured to determine different types of appearance attributes, a different number of appearance attributes, and/or appearance attributes for different pairs of illumination and viewing directions than the first appearance capture device.

Each of the first and/or second appearance capture devices may be a multi-angle spectrophotometer, which is configured to determine color attributes for a plurality of combinations of illumination and viewing directions.

The first and/or second appearance capture devices may further have imaging capabilities to determine texture attributes in addition to color attributes.

The set of available appearance attributes of the first and/or second material may include appearance attributes for a plurality of combinations of illumination and viewing directions, in particular, color attributes at two or more combinations of illumination and viewing directions and/or texture attributes at two or more combinations of illumination and viewing directions.

In some embodiments, the available appearance attributes of the first material comprise a plurality of sets of measured image data, each set of measured image data associated with a different combination (usually: pair) of illumination and viewing directions. To this end, the appearance capture device used for determining the appearance attributes of the first material may comprise one or more cameras configured to determine image data for a plurality of combinations (e.g., pairs) of illumination and viewing directions. In some embodiments, all combinations of illumination and viewing directions for the measured image data comprise the same viewing direction, but a plurality of different illumination directions (or, equivalently, the same illumination direction and a plurality of different viewing directions). This may be the case, e.g., when an appearance capture device having a single camera and a plurality of different light sources is used. In other embodiments, the combinations of illumination and viewing directions comprise two or more viewing directions.

In some embodiments, the measured appearance attributes of the first material may lack texture attributes or may contain only a limited set of texture attributes. This situation may occur, for instance, if the appearance capture device used for measuring the target object that comprises the first material lacks imaging capabilities or has only very limited imaging capabilities. In this case, the measured appearance attributes of the first material may be complemented by texture attributes from a different source. In particular, the appearance attributes associated with the first material may comprise texture attributes, in particular, in the form of image data, that have been determined based on texture attributes associated with one or more reference materials and/or with the second material. In particular, some or all of the texture attributes associated with the first material may be determined based on calculated texture attributes, in particular, in the form of image data, associated with the second material or based on measured texture attributes, in particular, in the form of image data, associated with a trial object that comprises the second material. Accordingly, the method may comprise determining texture attributes, in particular, in the form of image data, in the set of appearance attributes associated with the first material based on texture attributes, in particular, in the form of image data, associated with one or more reference materials and/or with the second material. This may involve modifying pixel values of image data associated with the reference materials and/or with the second material. In this manner the first material can be visualized with a realistic impression of texture even if the measured texture information alone would be insufficient for this purpose.

In still other embodiments, the available appearance attributes of the second material or of the reference materials may lack texture attributes or may contain only a limited set of texture attributes. This situation may occur, for instance, if a database containing appearance attributes of reference materials was created using a simpler or older appearance capture device that lacks imaging capabilities or has only limited imaging capabilities. In this case, the appearance attributes associated with the second material that have been calculated based on appearance attributes of the reference materials may be complemented by texture attributes, in particular, in the form of image data, from a different source. In particular, the set of appearance attributes associated with the second material may comprise texture attributes, in particular, in the form of image data, that have been determined based on measured texture attributes, in particular, in the form of image data, associated with the first material and/or with a trial object that comprises the second material. In particular, some or all of the texture attributes associated with the second material may be determined based on measured texture attributes, in particular, in the form of image data, associated with the first material or on measured texture attributes, in particular, in the form of image data, associated with a trial object that comprises the second material. Accordingly, the method may comprise determining texture attributes associated with the second material based on measured texture attributes associated with the first material and/or based on texture attributes associated with a trial object that comprises the second material. This may involve modifying pixel values of image data associated with the first material and/or with the trial object. In this manner the second material can be visualized with a realistic impression of texture even if the available texture information alone would be insufficient for this purpose.

As already outlined above, the set of available appearance attributes of each material may be sparse in comparison to a dense set of appearance attributes in the associated appearance model. Generating an instance of the appearance model for a material may comprise at least one of the following operations:

interpolating between available appearance attributes of the material at different combinations of illumination and viewing directions; and extrapolating from available appearance attributes of the material at selected combinations of illumination and viewing directions.

As discussed above, the appearance model may comprise a discrete texture table having a plurality of entries in the form of destination textures, each entry being associated with a particular set of coordinates, each set of coordinates being indicative of lighting and viewing directions under which the material is viewed. Generating an instance of the appearance model may then comprise at least one of the following operations:

(i) determining entries of the discrete texture table by mapping available texture attributes to entries of the discrete texture table; and/or (ii) determining entries of the discrete texture table by carrying out the above-described statistical texture synthesis operation based on available texture attributes at different combinations of illumination and viewing directions.

The present disclosure further provides a device for generating a destination texture. The device comprises a processor and a memory, the memory comprising program instructions configured to cause the processor to carry out the above-described method.

The device may further comprise a display device.

The present disclosure further provides a computer program product comprising program instructions which, when executed by a processor, cause the processor to carry out the above method. The computer program product may comprise a non-volatile computer-readable medium on which the program instructions are stored. The non-volatile medium may include a hard disk, a solid-state drive, a memory card or any other type of computer-readable medium as it is well known in the art.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Definitions

Figure 1:
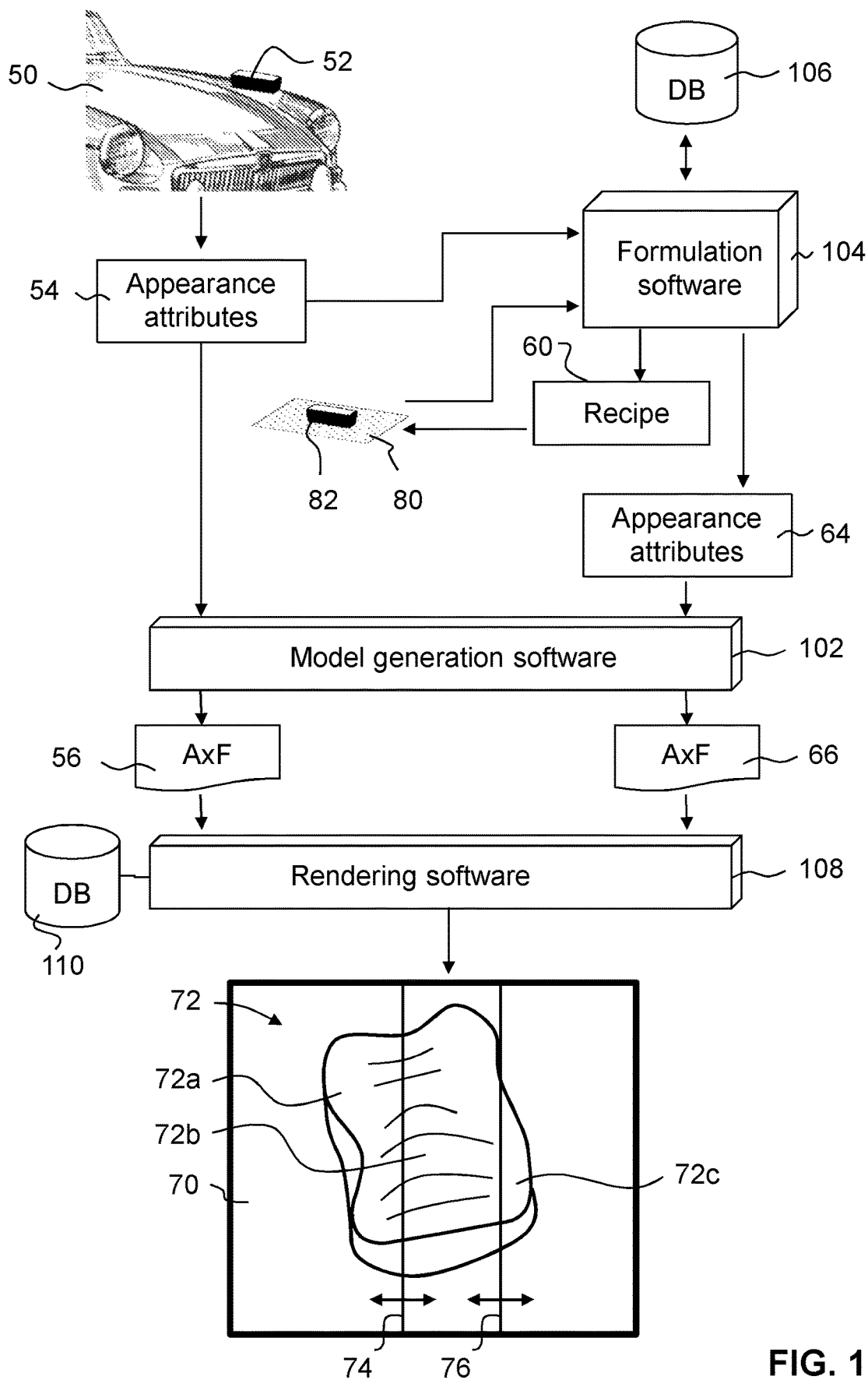
FIG. 1 shows a schematic illustration of a method of visualizing the appearances of two materials.

In the present disclosure, references in the singular may also include the plural. Specifically, the word "a" or "an" may refer to one, or one or more, unless the context indicates otherwise.

The term "colorant" is to be understood as a constituent of a material that provides the appearance of color when light it reflected from it or transmitted through it. Colorants include pigments and dyes. A "pigment" is a colorant that is usually insoluble in a base constituent material. A pigment can be from natural or synthetic sources. A pigment can comprise organic and inorganic constituents. The term "pigment" also encompasses so-called "effect pigments", which produce special effects in a material. Examples include interference pigments and reflective particles or flakes. A "dye" is a colorant that is usually soluble in a base constituent material.

The term "recipe" is to be understood as relating to a collection of information that determines how a material is to be prepared. The material may comprise a coating material, such as automotive paint, a solid material, such as plastic materials, a semi-solid material, such as gels, and combinations thereof. The recipe includes, in particular, the concentrations of the constituents of which the material is composed, such as a base and colorants. A material that has been prepared according to a recipe may also be called a "formulation".

The term "visual appearance" or briefly "appearance" is to be understood broadly as the way in which an object reflects and transmits light, including but not limited to, how individuals viewing the object perceive color and surface texture of the object in various viewing conditions. Appearance also includes instrumented measurements of how an object reflects and transmits light.

One aspect of visual appearance is color. The "color" of an object is determined by the parts of the spectrum of incident white light that are reflected or transmitted without being absorbed. The color of an object can be described by "color attributes". In general terms, color attributes are indicative of the spectral response of the object when it is illuminated by incident light. In the context of the present disclosure, the term "color attribute" is to be understood broadly as encompassing any form of data that is indicative of the spectral response of an object when it is illuminated by incident light. Color attributes can take the form of color values in an arbitrary color space, e.g. in a trichromatic color space like RGB or CIEXYZ, or in any other color space like CIELAB ($L^*a^*b^*$), or in the form of spectral data representative of a spectral response of a material to incident light, in arbitrary format. In the context of the present disclosure, color attributes may in particular include reflectance values and/or absorption and scattering coefficients of a material at a plurality of wavelengths. A "discrete color table" is to be understood as relating to a collection of sets of color attributes, each set of color attributes associated with a different combination of illumination and viewing directions.

Another aspect of visual appearance is texture. The term "texture" is to be broadly understood as referring to the spatial variation of appearance across the surface of the material, both on a microscopic or mesoscopic scale (i.e., on a scale on which individual structure elements can normally not be discerned by the naked eye) and on a macroscopic scale (i.e., on a scale on which individual structure elements can be discerned by the naked eye). Texture as understood in the present disclosure includes phenomena like coarseness, sparkle, and variations of surface topography. Texture can be described by "texture attributes". In the context of the present disclosure, the term "texture attributes" is to be understood broadly as encompassing any form of data that is able to quantify at least one aspect of texture. Examples of texture attributes include global texture attributes such as a global coarseness parameter or a global sparkle parameter. In some embodiments, texture attributes can include a normal map or a height map. In some embodiments, texture attributes can include image data. In some embodiments, the image data can be associated with particular combinations of illumination and viewing directions. In such embodiments, the texture attributes can comprise a plurality of sets of image data, each set of image data associated with a different combination of illumination and viewing directions. A "discrete texture table" is to be understood as relating to a collection of sets of texture attributes, preferably in the form of image data, each set of texture attributes associated with a different combination of illumination and viewing directions. In some embodiments of the present disclosure, images in a discrete texture table are generated from a set of source textures, and these images are accordingly called "destination textures".

The term "appearance model" is to be understood as relating to a formal construct that describes appearance in mathematical terms, using a plurality of material-dependent parameters called "appearance attributes". The appearance attributes may include color attributes and texture attributes. The appearance model is preferably device- and platform-independent, i.e., it is independent of a specific measurement device with which the appearance attributes might have been determined, and it is independent of a specific rendering platform for visualization. The appearance model offers a mathematical description of appearance in such a form and at such a level of completeness that it is possible to generate visualizations (i.e., render and display) of a virtual object under arbitrary illumination and viewing conditions, using the appearance model combined with a geometric model of the virtual object. For any portion of the surface of a virtual object whose geometry is defined by the geometric model and for any given illumination and viewing angle, an appearance model provides the necessary information to calculate appropriate appearance attributes.

A "virtual object" is an object that exists only virtually in a computer. A virtual object may or may not correspond to a real, tangible object. A virtual object may be defined mathematically by a geometric model and by associated appearance information.

A "geometric model" of a real or virtual object is to be understood as an at least approximate representation of the geometry of any surface of the object in three dimensions. For instance, in some embodiments, a geometric model defines curves along at least two mutually orthogonal directions. In other embodiments, a geometric model defines a plurality of polygons or facets. A geometric model may be represented, e.g., by a CAD file.

The expression "instance of an appearance model" is to be understood as relating to a set of values for all appearance attributes of a particular appearance model, supplemented by information that enables identification of the underlying appearance model. In other words, while an appearance model itself is a formal construct that defines how appearance is described in terms of a set of appearance attributes, an instance of an appearance model includes actual values of these appearance attributes particular to a given material, e.g., as determined by measurement and/or as derived from appearance attributes of individual constituents of a material. In particular, an instance of an appearance model may be provided in the form of a data file. Preferably the data file is in a device- and platform-independent format such as the AxF™ format proposed by X-Rite. An AxF file may therefore be considered a representation of an "instance" of an appearance model. However, the present disclosure is not limited to a particular format for the instance of the appearance model, and the instance of the appearance model may be provided in another file format, e.g., the MDL format, or it may even be provided in a different form than a file, e.g., as a data stream.

Brightness attributes may be represented in an appearance model with a bidirectional reflectance distribution function. A "bidirectional reflectance distribution function" (BRDF) is to be understood in the usual sense as a function that defines how light is reflected at an opaque surface dependent on illumination and viewing directions, providing the ratio of reflected radiance exiting along a viewing direction to the irradiance incident on the surface from an illumination direction. If the surface exhibits spatial variations of this ratio, the BRDF is understood as providing an average of the ratio over the surface area. A "monochromatic brightness BRDF" is a BRDF that provides a (possibly weighted) average of the ratio over all visible wavelengths, thus modeling the overall brightness variation of a surface.

"Image data" are data that represent an image. Images include images of actual target surfaces or objects and synthesized images derived from one or more geometric models combined with one or more sets of appearance attributes. An image can take the form of a two-dimensional array of picture elements ("pixels"), each pixel having a pixel value. The pixel value can be representative of reflectance at the location of the pixel at a particular wavelength, averaged over a particular wavelength range, or averaged over all visible wavelengths. Accordingly, in some embodiments, image data can be provided in the form of an array of pixel values. In other embodiments, image data can be provided in compressed form or in a transformed form. A "set of image data" is a data set that comprises or consists of image data for at least one image, i.e., a data set that represents one or more images.

Two images X, Y of equal size are considered "dissimilar" on a pixel-by-pixel basis if their pixel values are uncorrelated. Dissimilarity can be quantified by a suitably defined correlation measure of the pixel values. For the purposes of the present disclosure, the images can be considered "dissimilar" if the absolute value of Pearson's product-moment correlation coefficient $r_{XY}$ for the pixel values in the images is not larger than 0.1, preferably not larger than 0.02. Pearson's product-moment correlation coefficient $r_{XY}$ is defined as the quotient of the covariance of the pixel values divided by the product of the standard deviations (i.e., the square roots of the variances) of the pixel values of both images:

$$r_{XY} = \frac{\sum_{i=1}^{N}(x_i - \bar{x})(y_i - \bar{y})}{\sqrt{\sum_{i=1}^{N}(x_i - \bar{x})^2}\sqrt{\sum_{i=1}^{N}(y_i - \bar{y})^2}}$$

Here, $x_i$ designates a pixel value in image X, $\bar{x}$ designates the arithmetic mean of the pixel values in image X, $y_i$ designates a pixel value in image Y, $\bar{y}$ designates the arithmetic mean of the pixel values in image Y, N indicates the number of pixels in each image (being the same for both images as the images have equal size), and the summation is over all pixels. The arithmetic mean $\bar{x}$ of the pixel values in an image X is defined in the usual manner as $$\bar{x} = \frac{1}{N}\sum_{i=1}^{N} x_i.$$

A "Rusinkiewicz parameterization" is a description of the illumination and viewing directions in terms of a "halfway vector", which is defined as the vector that is halfway between the incoming and reflected rays, and a "difference vector", which is the illumination direction in a frame of reference in which the halfway vector is at the north pole. The spherical coordinates of the halfway vector in a sample-fixed reference frame in which the surface normal is the at the north pole can be designated as $(\theta_h, \phi_h)$, where $\theta_h$ is called the polar "halfway angle". The spherical coordinates of the difference vector in a reference frame in which the halfway vector is at the north pole can be designated as $(\theta_f, \phi_f)$ where $\theta_f$ is called the polar "difference angle". The remaining angles that define illumination and viewing directions are the azimuthal angles $\phi_h$ and $\phi_f$. For details, reference is made to [Rus98], whose contents are incorporated herein by reference in their entirety.

In some embodiments of the present disclosure, texture attributes associated with an appearance model are determined using barycentric coordinates. "Barycentric coordinates" are coordinates in a coordinate system in which the location of a point of a simplex (i.e., a triangle in the case of two dimensions) is specified by weights assigned to its vertices. In two dimensions, a simplex is a triangle. Barycentric coordinates in two dimensions of a point r with respect to the vertices $r_1$, $r_2$, and $r_3$ are given by three numbers $\lambda_1$, $\lambda_2$, $\lambda_3$, such that $$(\lambda_1+\lambda_2+\lambda_3)r=+\lambda_2 r_2+\lambda_3 r_3,$$

where at least one of the numbers $\lambda_1$, $\lambda_2$, $\lambda_3$ is non-zero. The barycentric coordinates may be required to be non-negative (i.e., the point may be require to be located inside the convex hull of the vertices). The barycentric coordinates may be required to fulfill the condition $\lambda_1+\lambda_2+\lambda_3=1$. They are then called "absolute barycentric coordinates".

An "appearance capture device" is a device that is able to determine one or more appearance attributes of an object. Depending on the appearance attributes to be determined, an appearance capture device can take the form of, e.g., a camera, a colorimeter, a spectrophotometer, or an imaging spectrophotometer.

A "spectrophotometer" is a device for determining the reflection and/or transmission properties of a surface or material as a function of wavelength, i.e., the spectral response of an object, under illumination with visible light. Different types of spectrophotometers are known, having different geometries and being optimized for different purposes. One important type is the "integrating sphere spectrophotometer". An integrating sphere spectrophotometer comprises an "integrating sphere", i.e., a hollow spherical cavity delimited by a diffusely reflective white inner surface, having at least one entrance port for illumination and at least one exit port for observation. The integrating sphere causes a uniform scattering or diffusing effect. Light rays incident on any point on the inner surface are, by multiple scattering reflections, distributed equally to all other points. The effects of the original direction of light are minimized. Examples of integrating sphere spectrophotometers are the models Ci7860 and Ci7500 of X-Rite. Other types of spectrophotometers determine spectral information for only a single narrow range of directions of illumination, e.g., at 45° to the surface normal, and a single narrow range of directions of observation, e.g., at 0° to the surface normal. Examples include the models 962 and 964 available from X-Rite. Yet other spectrophotometers, called "goniospectrophotometers" or "multi-angle spectrophotometers", are capable of determining spectral information for a plurality of combinations of different illumination and observation directions. An "imaging spectrophotometer" additionally has imaging capabilities, i.e., it can comprise one or more cameras to take one or more digital images of an object. Examples of multi-angle spectrophotometers with imaging capabilities include the benchtop model TAC7 or the handheld models MA-T6 or MA-T12 available from X-Rite.

A material may be transparent, translucent or opaque. A material is "transparent" if it allows light to pass through the material without appreciable absorption and scattering of light. A material is "translucent" if it allows light to pass through, but light may be scattered at either of the two interfaces or internally. A material is "opaque" if it does not transmit light. A material may be opaque only in some spectral regions while it is translucent or transparent in other spectral regions, and vice versa. For instance, a material may strongly absorb red light, being essentially opaque to red light, while only weakly absorbing blue light, being transparent for blue light. Some more complex materials, especially gonioapparent materials, may comprise a combination of transparent, translucent, and opaque materials. For example, a paint coating may include an opaque base layer and a transparent clear coat. Opaque (reflective or interference flakes) or translucent pigments may be included in opaque, transparent, or translucent layers of a paint coating.

For the purposes of the present disclosure, a material will broadly be considered "translucent" if a reasonably thin slice of the material transmits an appreciable fraction of incident radiant flux in at least one portion of the visible spectrum, e.g., if a slice having a thickness of 0.1 mm transmits at least 1% of the incident radiant flux in at least one portion of the visible spectrum. In this sense, the term "translucent" encompasses the term "transparent", i.e., for the purposes of the present disclosure, a transparent material is to be considered to be translucent as well. Examples of translucent materials in this sense include many common plastics materials on the basis of polymers, including but not limited to organic polymers like PET, PP, PE, PMMA, PS, PC, PVC, PTFE, Nylon, organic copolymers like styrene-butadiene copolymer, inorganic polymers like polysiloxane, and many natural polymers. A translucent plastics material can comprise pigments and additives. However, also other classes of materials can be translucent in the sense of the present disclosure, including, e.g., silicate glass or paper.

For the purposes of the present disclosure, a material is to be understood as "homogeneous" if its subsurface light transport properties do not vary on a macroscopic or mesoscopic scale, e.g., on a scale of more than 1 μm. In particular, a homogeneous material does not comprise mesoscopic or macroscopic gonioapparent objects like flakes.

The term "macroscopic surface geometry" is to be understood as relating to the overall geometry of a product, excluding microscopic or mesoscopic surface structure, i.e., excluding variations of the surface geometry on a microscopic or mesoscopic scale below, e.g., 1 mm. For instance, local variations of surface height of less than, e.g., 1 mm from a local average may be considered microscopic or mesoscopic surface structure, and accordingly the macroscopic surface geometry may be equated with the surface geometry after averaging over a length scale of at least 1 mm. A surface geometry is "continuously curved" if, in mathematical terms, it corresponds at least approximately and at least locally to a two-dimensional differentiable manifold in three-dimensional Euclidean space.

The term "rendering" refers to the automatic process of generating a photorealistic image of a scene by means of a computer program. In the present disclosure, the scene comprises at least one virtual object. Input information for a rendering operation includes a 3D geometric model of the at least one virtual object, at least one set of appearance attributes associated with the virtual object, information about the position and orientation of the at least one virtual object in the scene, the lighting conditions (which may take the form of an environment map), and parameters that characterize the observer such as the viewpoint, focal length, field of view, depth of field, aspect ratio, and/or spectral sensitivity. The output of a rendering operation is an image of the scene, which includes an image of at least a portion of the virtual object. Many different rendering algorithms are known at different levels of sophistication, and software used for rendering may employ a number of different techniques to obtain a final image. Tracing every particle of light in a scene is often impractical, as it requires excessive computing time. Therefore, simplified techniques for modelling light transport are commonly used, such as ray tracing and path tracing . . . .

The term "visualizing" encompasses rendering a scene comprising a virtual object and displaying the rendered scene. For displaying, a display device is used. The term "display device" or briefly "display" is to be understood as relating to an output device of a computer for presentation of information in visual form. A display device may take the form of a computer monitor, a TV screen, a projector, a VR headset, a screen of a handheld device such as a smartphone or tablet computer etc. The display device can be a touchscreen. In some embodiments, a display device can be a "virtual light booth" as disclosed in EP 3 163 358 A1 so as to provide a particularly realistic impression of a rendered scene.

The term "database" refers to an organized collection of data that can be accessed electronically by a computer system. In simple embodiments, the database can be a searchable electronic file in an arbitrary format. Examples include a Microsoft Excel™ spreadsheet or a searchable PDF document. In more sophisticated embodiments, a database can be a relational database that is maintained by a relational database management system using a language like SQL.

The term "computer" or "computing device" refers to any device that can be instructed to carry out sequences of arithmetic or logical operations automatically via a program. Without limitation, a computer can take the form of a desktop computer, a notebook computer, a tablet computer, a smartphone, a programmable digital signal processor etc. A computer generally includes at least one processor and at least one memory device. A computer may be a subunit of another device, such as an appearance capture device. A computer may configured to establish a wired or wireless connection to another computer, including a computer for querying a database. A computer can be configured to be coupled to a data input device like a keyboard or a computer mouse or to a data output device like a display or a printer via a wired or wireless connection.

A "computer system" is to be broadly understood as encompassing one or more computers. If the computer system comprises more than one computer, these computers do not necessarily need to be at the same location. The computers within a computer system may communicate with one another via wired or wireless connections.

A "processor" is an electronic circuit which performs operations on an external data source, in particular, a memory device.

A "memory device" or briefly "memory" is a device that is used to store information for use by the processor. The memory device may include volatile memory, as for random-access memory (RAM), and nonvolatile memory, as for read-only memory (ROM). In some embodiments, the memory device may include a non-volatile semiconductor memory device such as an (E)EPROM or a flash memory device, which may take the form of, e.g., a memory card or a solid-state disk. In some embodiments, the memory device may include a mass storage device having mechanical components, like a hard disk. The memory device can store a program for execution by the processor. A non-volatile memory device may also be called a non-volatile computer-readable medium.

A "program" is a collection of instructions that can be executed by processor to perform a specific task.

A "wired connection" is a connection via an electrical conductor. A wired connection can include one or more cables. A "wireless connection" is a connection that includes the electromagnetic transfer of information between two or more points that are not connected by an electrical conductor. Wireless connections include connections via WiFi™, Bluetooth™, 3G/4G/5G mobile networks, optical communications, infrared, etc.

Exemplary Embodiment of Method Using Color Formulation Software

FIG. 1 illustrates an exemplary embodiment of a method of visualizing the appearances of two or more materials in the context of vehicle repair.

Suppose that a damaged vehicle needs to be repaired in a body shop. A technician at the body shop uses a hand-held appearance capture device 52 to determine a set of appearance attributes 54 of a paint coating on an intact vehicle part. The paint coating is an example of a target material, and the intact vehicle part is an example of a target object that comprises the target material. The appearance attributes 54 of the paint coating comprise, on the one hand, color attributes in the form of spectral data for a plurality of pairs of illumination and viewing directions and, on the other hand, texture attributes in the form of image data for a plurality of (possibly different) pairs of illumination and viewing directions.

The appearance capture device 52 transmits the measured appearance attributes 54 to a computer system. The computer system may comprise a local client computer at the premises of the body shop. The computer system may further comprise one or more remote computers at one or more different locations than the body shop. The local client computer may be, e.g., a mobile electronic device, such as a notebook computer or tablet computer. The remote computers may act as servers for the local client computer at the body shop.

The computer system executes several elements of software. In a first aspect, the computer system executes model generation software 102. The model generation software 102 generates a first instance 56 of a selected formal appearance model, based on the measured appearance attributes 54, the first instance 56 representing the appearance of the target material. The first instance of the appearance model is stored in a first AxF file in a device- and platform-independent form.

In a second aspect, the computer system executes color formulation software 104. The color formulation software 104 determines one or more candidate recipes 60 from a database of reference recipes. Each candidate recipe defines a candidate material (in the present example, a candidate paint coating) whose appearance attributes are likely to match the measured appearance attributes 54 of the target material, the candidate material comprising one or more colorants in a base formulation. For determining the candidate recipes, the formulation software 104 retrieves predetermined appearance attributes associated with different reference materials from a database 106. In particular, the predetermined appearance attributes may be associated with individual colorants and/or with reference recipes comprising one or more colorants dispersed in a base formulation. In particular, the database 106 may comprise two sub-databases: a colorant database that stores appearance attributes associated with individual colorants and base materials, and a recipe database that stores appearance attributes associated with reference recipes. The appearance attributes in database 106 may have been determined beforehand by carrying out measurements on reference objects comprising reference materials made according to the reference recipes or comprising the constituents of the reference recipes.

For instance, for determining the appearance attributes associated with individual colorants in the colorant database, drawdowns coated with formulations comprising a single colorant at different concentrations may be prepared and measured; for determining the appearance attributes in the recipe database, drawdowns coated with formulations that have been prepared according to the reference recipes may be measured. The measurements may be carried out using an appearance capture device which may be of the same type as the appearance capture device 52, or which may be of a different type, as will be discussed in more detail below.

The formulation software uses the predetermined appearance attributes retrieved from database 106 to compute candidate recipes whose associated appearance attributes are expected to be "close" to the measured appearance attributes of the target material. The appearance attributes of a candidate recipe are "close" to the measured appearance attributes of the target material if an appearance difference between the appearance attributes of the candidate recipe and the measured appearance attributes are small according to some predefined difference norm. In other words, the formulation software carries out a minimization algorithm for determining candidate recipes that are near a minimum of the difference norm. The formulation software 104 outputs one or more of the thus-determined candidate recipes 60. The technician selects and optionally manually modifies one of the candidate recipes. The formulation software 104 provides a set of candidate appearance attributes 64 for the selected (and optionally modified) candidate recipe 60. In some use cases, the candidate recipe corresponds to a single reference material, i.e., the candidate appearance attributes comprise appearance attributes associated with a single reference material. In other use cases, the candidate appearance attributes are calculated from measured appearance attributes associated with multiple reference materials. The reference materials may comprise individual constituents of the candidate recipe in a manner that enables a determination of appearance attributes associated with these individual constituents. This is particularly useful when a candidate recipe is modified by altering the proportions of individual constituents of the recipe. The model generation software 102 receives the candidate appearance attributes 64 and generates a second instance 66 of the appearance model, representing the expected appearance of a paint coating that has been prepared according to the candidate recipe 60. The second instance 66 of the appearance model is stored in a second AxF file.

In a third aspect, the computer system executes rendering software 108. The rendering software renders a virtual object 72, i.e., it creates a photorealistic digital image of the virtual object 72 based on a geometric model of the surface geometry of the virtual object 72, at least one instance of an appearance model, and illumination and viewing conditions. The rendered virtual object 72 is displayed in a scene on a display 70. The geometric model defines a continuous three-dimensional macroscopic surface geometry having surface normals that are distributed over a comparatively large solid angle, i.e., it comprises curved or rectilinear surface portions that have directions perpendicular to the surface portions pointing into many different directions. In 3D computer graphics, it is well known to use a polygonal modeling as an approach for modeling objects by representing or approximating their surfaces using polygon meshes. These are also considered to be a continuously curved three-dimensional macroscopic surface if the polygon meshes essentially appear as a continuously curved surface when rendered. The rendering software generates a two-dimensional image of the virtual object 72 in a particular orientation and under particular illumination conditions, assuming particular viewing conditions. Surface geometry, orientation and illumination conditions are chosen in such a manner that the rendered image gives a good impression of the appearance of the virtual object for a large range of angles between the surface normal, the illumination direction and the viewing direction, respectively, so as to allow an observer to assess the appearance of the rendered virtual object 72 for a large range of these directions simultaneously.

The virtual object 72 has first and second portions 72a, 72b that are adjacent to each other. The first portion 72a is rendered using the first instance 56 of the appearance model, while the second portion 72b is rendered using the second instance 66 of the appearance model. A virtual separating line 74 is visualized between the first and second portions 72a, 72b. The first and second portions 72a, 72b appear to meet at the virtual separating line 74.

The display 70 may be located at the body shop. For instance, the display 70 may be a touchscreen display of the local client computer at the body shop. The technician at the body shop can move the virtual line 74 across the display 70 using his finger or using a pointing device like a digital pen, a trackpad or a mouse and observe how appearance matches or differs between the first and second instances of the appearance model as rendered on the virtual object 72, i.e., between the appearance of the actual paint coating of the car as measured and the expected appearance of a paint coating that has been prepared according to the candidate recipe. Optionally, the technician can change the shape of the virtual object, rotate the virtual object in space, simultaneously changing illumination and viewing angles. Optionally, the technician can change the illumination conditions, including illumination directions and choice of illuminants.

In some embodiments, the virtual object 72 may have the shape of an actual part of the damaged car, for instance, the shape of the target object 50. To this end, the rendering software 108 may retrieve a three-dimensional geometric model corresponding to the geometry of the car part from a suitable memory, for instance, from a database 110 that stores geometric data of a plurality of car parts. To this end, the technician can provide, e.g., manufacturer and model of the damaged car or another type of vehicle information, such as a unique Vehicle Identification Number, along with one or more components to be rendered as virtual objects 72.

In other embodiments, the rendered virtual object 72 is a three-dimensional object that is different from an actual car part of a car to be repaired, but has a three-dimensional shape useful for inspecting appearance characteristics of various materials. Also in such embodiments, the rendering software 108 may retrieve a three-dimensional geometric model of the virtual object from a memory, e.g., from the database 110. Regardless of whether or not the virtual object 72 represents an actual car part, the virtual object 72 preferably allows for an inspection of color and texture differences for a large number of angles between the surface normal, the illumination direction and the viewing direction simultaneously.

The appearance of the first portion 72a of the rendered virtual object, when viewed on the display 70, does not need to perfectly match the appearance of the actual target object 50. In particular, the display 70 does not need to be calibrated. What matters is that the appearances of the first and second portions 72a, 72b are directly comparable to each other, both in color and in texture. This is possible even if the colors on the display are not true colors. Direct comparability of the appearances of the two portions 72a, 72b is ensured by using the same appearance model for both portions.

It should further be noted that neither the appearance model itself nor the rendering software need to be perfect in order to ensure direct comparability. It suffices that the appearance model and the rendering software enable a reasonably realistic judgement of differences between the two instances representing the actual coating material on the target object 50 and a coating material according to the candidate recipe 60.

If the visual comparison of the first and second portions 72a, 72b shows that the match is not yet satisfactory, the technician can modify the candidate recipe 60 in the formulation software 104 by selecting a different candidate recipe or by modifying the previously selected candidate recipe. The formulation software 104 provides the appearance attributes of the modified candidate recipe to the model generation software 102, which creates a modified second instance of the appearance model based on these attributes. The rendering software 108 can be instructed to render the second portion of the virtual object using the modified second instance of the appearance model, thereby replacing the previously candidate recipe in the visualization by the modified recipe, or the rendering software can be instructed to split the virtual object into three portions 72a, 72b, 72c so as to visualize the reference material together with both candidate recipes, adding another movable separating line 76 in the visualization ("recursive splitter control").

When a satisfactory match has been obtained, an actual trial object 80, e.g., a drawdown, may be produced with a selected candidate recipe 60. Appearance attributes of the trial object 80 may be determined using an appearance capture device 82. The appearance attributes of the trial object 80 may be compared to those of the target object 50 in order to determine whether the match is objectively within tolerances. This may be done by evaluating a suitable difference norm between the measured appearance attributes of the trial object 80 and those of the target object 50. In addition or in the alternative, a third instance of the appearance model may be generated, using the appearance attributes of the trial object 80, and the target material and the trial material may be visualized side-by-side on the display 70, using the associated instances of the appearance model. Of course, it is also possible to directly compare the physical trial object 80 to the physical target object 50 if both objects are located at the same location. If the match is not yet within tolerances, the formulation software 104 may further modify the candidate recipe 60 by considering the differences between the predicted appearance attributes of the candidate recipe 60 to those that have been actually determined for the trial object 80.

The trial object 80 may be produced by the technician in the body shop. However, most often the trial object 80 will be produced by a paint supplier at a location that is remote from the body shop. Therefore, the appearance capture device 82 for determining the appearance attributes of the trial object 80 may be different from the appearance capture device 52 that was used for determining the appearance attributes of the target object 50.

In the above embodiment it was assumed the technician at the body shop not only operates the appearance capture device 52 to determine the set of appearance attributes 54 of the target object 50, but that the same person also operates the formulation software 104 to define one or more candidate recipes and compares the first and second portions 72a, 72b of the virtual object 72 using the display 70. However, these tasks may as well be divided among different persons working at different locations. For instance, the technician at the body shop may transmit the appearance attributes 54 to a remote paint supplier, and a paint specialist at the paint supplier may define a candidate recipe using the formulation software 104 and may compare the different portions of the virtual object to determine whether the expected match is satisfactory. Accordingly, the computer system may comprise at least one computer under the control of the paint supplier, e.g., a computer executing the formulation software 104, the model generation software 102, and the rendering software 108. Many other possibilities exist for the division of tasks among different entities involved in the process. It will thus be apparent to a skilled person that the computer system may comprise several computers which may be located at different locations and which may be under the control of different entities, these computers communicating via wireless or wired data communication connections.

Other Possible Ways of Visualizing Objects Using the Instances of the Appearance Model In alternative embodiments, the instances of the appearance model may be used to visualize other scenes than a scene that comprises only a single virtual object having two or more portions that are visualized using different instances of the appearance model. For instance, a scene comprising two or more identical or different virtual objects may be visualized, each of the virtual objects being visualized using a different instance of the appearance model. In general terms, the scene comprises one or more virtual objects, and different portions of the scene are visualized using different instances of the appearance model. For instance, two identically shaped objects (e.g., two identically shaped vehicle parts like rearview mirrors) may be visualized side by side using first and second instances of the appearance model combined with a common geometric model.

Flow Diagram

Figure 2:
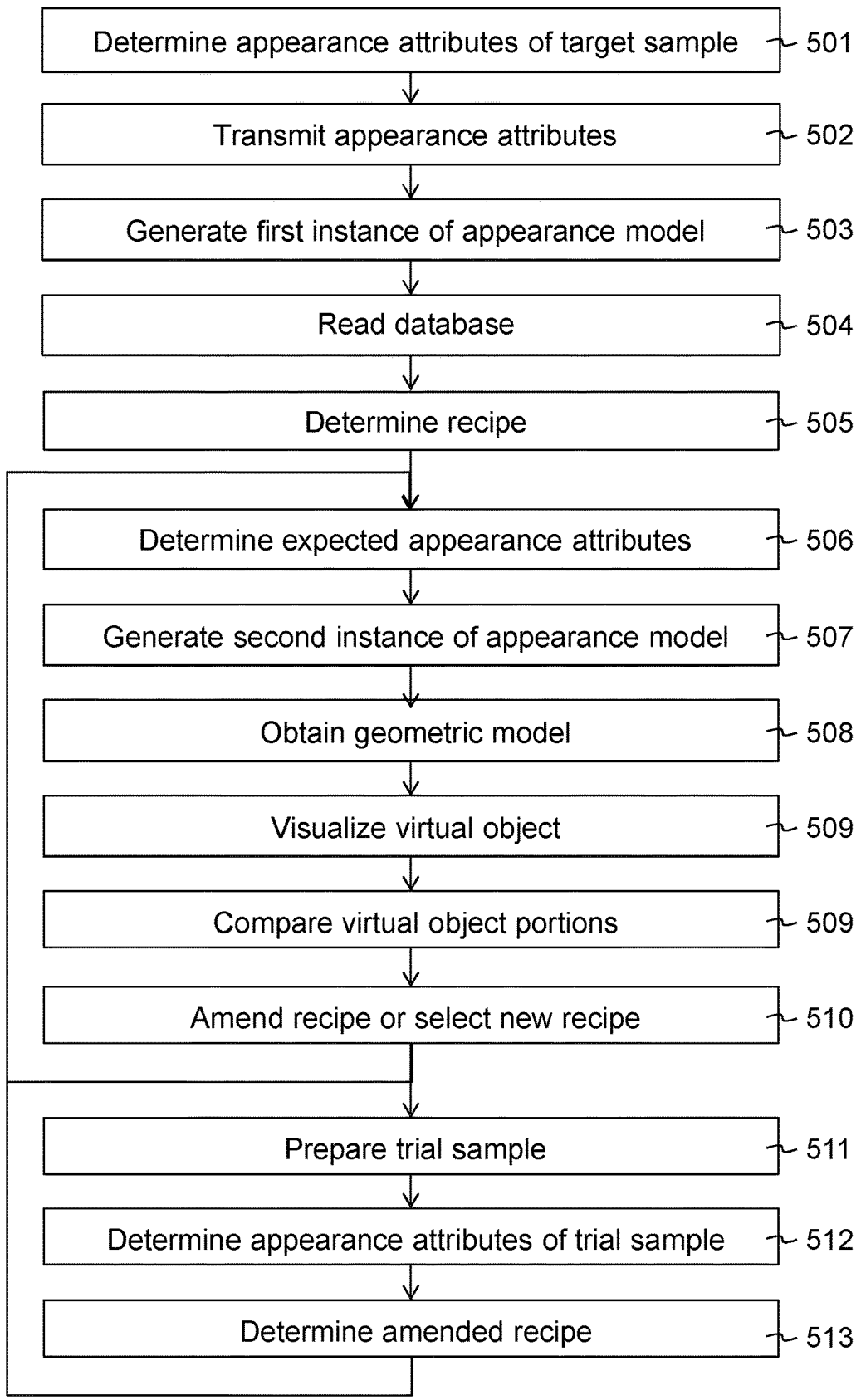
FIG. 2 shows a flow diagram illustrating the method of FIG. 1.

FIG. 2 shows an exemplary flow diagram illustrating the method of visualizing the appearances of two materials. In step 501, a user (e.g., a technician at the body shop) determines appearance attributes 54 of a target object 50 by measuring light reflectance and/or transmission properties, and optionally texture properties, of the target object with a first appearance capture device 52. In step 502, the appearance capture device 52 transmits these measured appearance attributes to a component of a computer system, e.g., to a handheld computer in the body shop. In step 503, the computer system generates a first instance 56 of an appearance model from the measured appearance attributes, using model generation software 102. In step 504, the computer system reads appearance attributes of one or more reference materials from a database 106. In step 505, the computer system determines one or more candidate recipes 60, using formulation software 104. The formulation software 104 may perform this step 505 by simply selecting one or more reference materials having similar appearance attributes as the measured appearance attributes 54 of the target object 50, by modifying a recipe of a retrieved reference material, or by generating a new candidate recipe 60 if a close match is not found in the database 106. In step 506, the computer system determines appearance attributes 64 associated with the candidate recipe 60, using the formulation software 104. In step 507, the computer system generates a second instance 66 of the appearance model from the appearance attributes 64 associated with the candidate recipe 60, using the model generation software 102. In step 508, the computer system visualizes the virtual object 72, using rendering software 108, based on the two instances 56, 66 of the appearance model, a geometric model of the virtual object 72, and illumination and viewing conditions. In step 509, the user compares rendered virtual object portions 72a, 72b, for acceptable appearance match. In step 510, the user may amend the recipe or select a different candidate recipe 60 if the visualized virtual object portions 72a, 72b do not provide an acceptable visualized match. Once an acceptable rendered match is obtained, in step 511, the user prepares the trial object 80 using the candidate recipe. In step 512, the same or a different user determines the appearance attributes of the trial object 80 using the second appearance capture device 82. In step 513, the appearance attributes of the trial object 80 are transmitted to the computer system, and the computer system determines an amended recipe, if necessary to refine the match, using the formulation software 104. Steps 506 to 513 can then be repeated for the amended recipe.

Computer System: Exemplary Hardware

Figure 3:
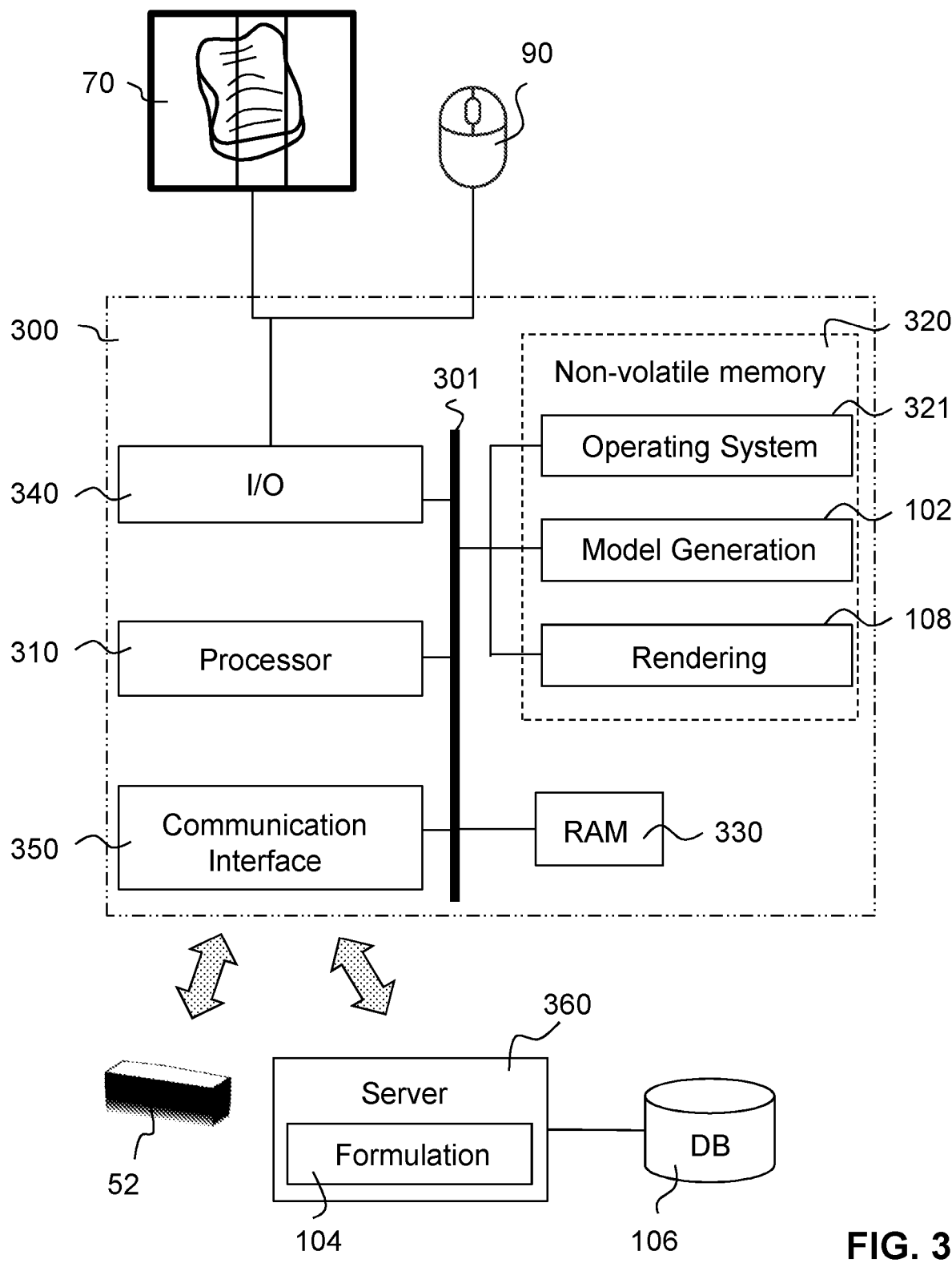
FIG. 3 shows a schematic hardware-oriented illustration of an exemplary color formulation system.

FIG. 3 illustrates an exemplary hardware-oriented block diagram of a computer system that may be used in the method illustrated in FIGS. 1 and 2. In this example, the computer system comprises two main components: a local client computer (e.g., a laptop or tablet computer) 300, which may be located at the body shop, and a remote server computer 360, which may be located at the premises of the paint supplier.

The various components of the local client computer 300 communicate with each other via one or more buses 301, as it is well known in the art. The local client computer 300 comprises one or more processors 310. The processors 310 may comprise, for instance, a single- or multi-core CPU and a GPU, as it is well known in the art. The local client computer 300 further comprises one or more non-volatile memory devices 320, such as a flash memory device and/or a hard disk drive. The non-volatile memory 320 stores, inter alia, the operating system 321 of the local client computer 300 and several application programs, including the model generation software 102 and the rendering software 108. The non-volatile memory 320 further stores user data. The local client computer 300 further comprises random-access memory (RAM) 330, and input/output (I/O) interface 340, and a communication interface 350. Attached to the communication interface are the display device 70 and a pointing device 90. The communication interface 350 may include, e.g., one or more of an Ethernet interface, a WiFi interface, a Bluetooth™ interface etc. The communication interface may serve for communication with the remote server 360.

The remote server computer 360 may be set up similarly to the client computer 300. It stores for execution the formulation software 104. The client computer 360 may include or be connected to the database 106. Communication between the server computer 360 and the client computer 300 may take place via a wired or wireless network, e.g., via a LAN or a WAN, in particular, via the Internet.

The client computer further communicates, via the communication interface 350, with the first and/or second appearance capture devices 52, 82.

In other embodiments, certain functionality of the client computer 300 is instead transferred to the server computer 360. In particular, the server computer, rather than the client computer, may execute the model generation software 102 and/or the rendering software 108. This may be useful if the client computer is a "thin" client with limited computing power.

In yet other embodiments, the computer system consists of only a single computer, which executes all of the above-mentioned software components.

Exemplary Appearance Capture Device

In the above example, the appearance capture devices 52 and 82 are preferably multi-angle spectrophotometers having imaging capabilities. Such devices are known per se. For instance, the MA-TX series available from X-Rite may be used.

Figure 4:
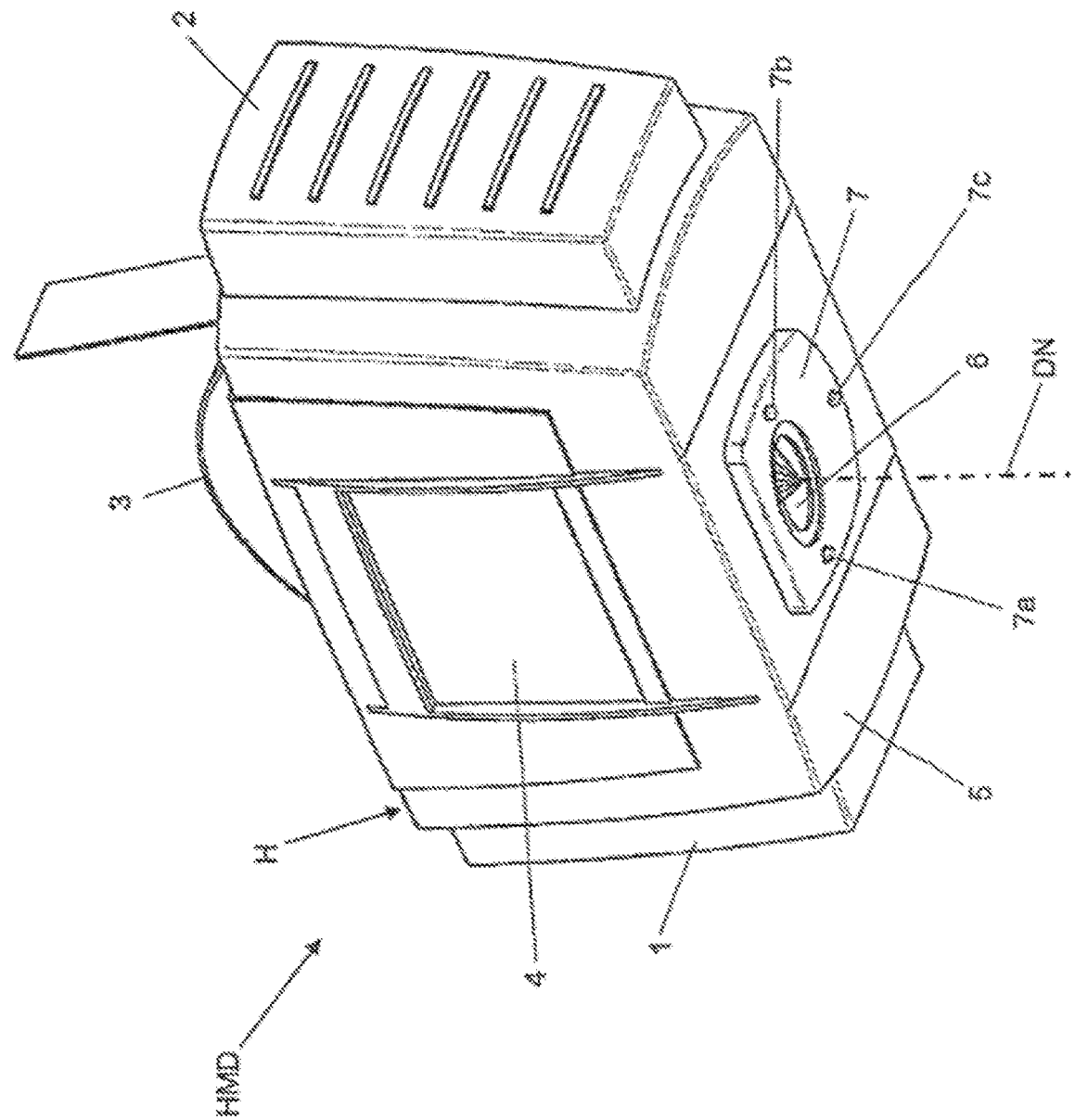
FIG. 4 shows a perspective view of an exemplary appearance capture device according to the prior art.
Figure 5:
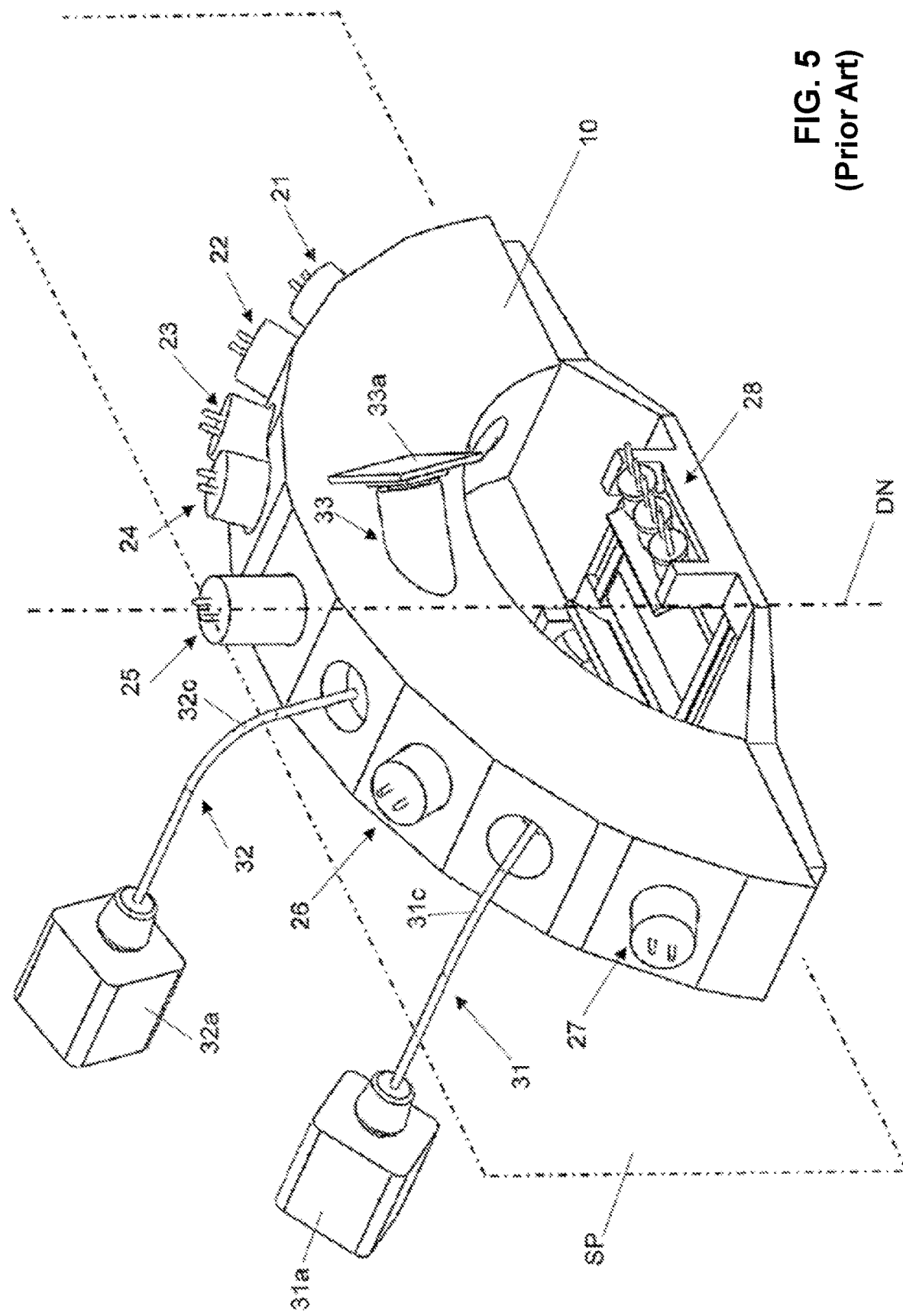
FIG. 5 shows a perspective view of a measurement array of the appearance capture device in FIG. 4.

An exemplary hand-held appearance capture device that may be used in conjunction with the present invention is illustrated in FIGS. 4 and 5. The appearance capture device of FIGS. 4 and 5 is described in greater detail in document US20140152990A1, the contents of which are incorporated herein in their entirety by reference for teaching a handheld appearance capture device.

The appearance capture device is configured for capturing the visual impression of a measurement object. In the following, the appearance capture device is also referred to as a "measurement device" or simply as a "device". In the following, the term "measurement array" is understood to mean the sum of the components of the hand-held measurement device which serve to illuminate a measurement spot on the surface of a measurement object and to capture the light reflected by this measurement spot and to convert it into corresponding electrical signals. The term "device normal" is understood to mean an imaginary straight line which is fixed relative to the device and extends essentially through the center point of the measurement opening of the measurement device and is perpendicular to the surface of the measurement object when the measurement device is positioned on a planar surface of the measurement object. The plane of the measurement opening usually lies parallel to the surface of the measurement object, such that the device normal is also perpendicular to the measurement opening.

The term "vertical" is understood to mean the direction of the device normal. Accordingly, vertical sections are to be understood to mean planar sections in a plane that contains the device normal or is parallel to the device normal. In the following description of the measurement device, directions and/or angles are relative to the device normal, which is spatially fixed with respect to the measurement device.

The hand-held measurement device shown in FIG. 4 is indicated as a whole by the reference sign HMD. It comprises a housing H which accommodates a measurement array, illustrated in FIG. 4, and an electronic control array (not shown) which controls the measurement array. Two gripping parts 1 and 2 are embodied laterally on the housing H. A wrist strap 3 is arranged on the upper side of the housing H. A display array 4 is provided on the front side of the housing H. Operating members (not shown) are arranged on the upper side of the housing H.

The lower side of the housing H comprises a housing base 5 reinforced by a base plate 7, which is provided with a measurement opening 6. The housing base 5 comprises an aperture (not indicated by a reference sign) in the region of the measurement opening 6, such that light can exit the interior of the housing through the aperture and the measurement opening 6 and, conversely, light from outside can enter the interior of the housing through the measurement opening 6 and the aperture. Three support members 7a, 7b and 7c are arranged around the measurement opening 6 on the base plate 7 and help in enabling the measurement device to be correctly positioned even on curved measurement surfaces, such that the device normal completely or at least largely coincides with the normal of the measurement surface in the center point of the measurement spot.

The device normal is indicated in FIG. 4 by the reference sign DN. It is perpendicular to the base plate 7 and extends through the center point of the measurement opening 6.

The setup of the measurement array is illustrated in FIG. 5. It comprises an arc body 10 which is fixedly held in the housing H and in which optical and/or photoelectric components of the measurement array are arranged. In the exemplary embodiment shown, these components comprise seven illumination means 21, 22, 23, 24, 25, 26, and 27, and three pick-up means 31, 32, and 33. Additionally, a diffusely illuminating illumination means 28 is also provided in the immediate vicinity of the measurement opening 6.

The seven illumination means 21 to 27 illuminate the measurement spot on the surface of a measurement object along different illumination directions in relation to the device normal DN. For instance, the optical axes of the illumination means 21 to 27 may be oriented at angles of −60°, −45°, −30°, −20°, 0°, +30° and +65° relative to the device normal. All seven illumination means 21 to 27 are arranged such that their optical axes lie in a common plane which contains the device normal DN, in the following referred to as the system plane SP.

Two of the three pick-up means 31 to 33 are embodied as spectral measurement channels; the third pick-up means is embodied as a spatially resolved color measurement channel. The pick-up means receive the measurement light reflected in the region of the illuminated measurement spot of the measurement object at viewing angles of +15° and +45° in the system plane SP. The two pick-up means 31, 32 that form spectral measurement channels comprise two spectrometers 31a and 32a to which the measurement light is fed by means of lenses and optical fibers 31c and 32c. The pick-up means 33 that forms a spatially resolved measurement channel comprises a color-enabled (RGB) camera 33a to which measurement light is applied via a beam splitter and a lens (not shown). The beam splitter is situated in the pick-up beam path of the pick-up means 32 and directs a part of the measurement light at the viewing angle of +15° laterally out of the arc body 10 onto the camera 33a. The pick-up means 32 and 33 thus share the measurement light and receive it at exactly the same viewing angle.

The measurement geometry is the reverse of ASTM standards E2194 and E2539, in which two specular illuminations at 15° and 45° and six specular spectral channels at 0°, 30°, 65°, −20°, −30° and −60° are defined for measurements on metallic and pearlescent effect pigments. One additional illumination means 22 at angle −45° is provided for measuring gloss in combination with the pick-up means 31.

The two spectrometers 31a and 32a spectrally resolve the measurement light fed to them at the viewing angles 45° and 15°, respectively, and respectively produce a set of spectral measurement values per measurement, each measurement value corresponding to intensity in a different wavelength range. The spectrometers 31a, 32a do not spatially resolve the measurement light, i.e., they spectrally resolve the entire measurement light that they receive.

The RGB camera 33a resolves the measurement light fed to it at the viewing angle 15° both spatially and spectrally. Spectral resolution is limited to three channels according to the three colors RGB. The RGB camera correspondingly produces a raw dataset of 3*n measurement values per measurement, wherein n is the number of resolved pixels.

The diffusely illuminating illumination means 28 is provided so that the measurement device also supports a measurement mode with diffuse illumination conditions. The illumination means 28 is configured as an LED background illumination which illuminates the measurement object directly from a large spatial angle. It comprises two rows of white light-emitting diodes arranged on both sides of the measurement opening 6 and two inclined diffusor films, each assigned to one row, for homogenizing the illumination. The two rows of LEDs can be separately controlled by the control array.

Of course, depending on the envisaged application, other types of illumination means can be employed as well.

The hand-held measurement device described above is equipped with seven illumination means and three pick-up means for measuring purposes. It is possible to use other combinations of illumination means and pick-up means. The illumination means need not necessarily be arranged in a plane.

The output of the measurement device comprises a set of appearance attributes. Some of these appearance attributes are color attributes, e.g., in the form of the spectral measurement values determined by the spectrometers or in the form of color values derived therefrom, e.g., RGB, CIELAB or CIEXYZ values. Other appearance attributes are texture attributes, e.g., in the form of the raw image data obtained by the RGB camera or in the form of image data derived therefrom, e.g., in the form of monochromatic greyscale image data. The set of appearance attributes that is obtained from the measurement device is generally sparse compared to the appearance attributes required to generate an instance of an appearance model, as will be discussed in more detail in the next section.

Example of Appearance Model

As already outlined above, many different appearance models have been proposed in the art. In the following, an example will be described, which is particularly useful for describing the appearance of modern vehicle coatings. This exemplary appearance model is a refinement of the model proposed in [RMS+08]. The contents of [RMS+08] are incorporated herein by reference in their entirety for teaching an exemplary appearance model. The presently discussed appearance model is also called the "CPA2 model".

The appearance model assumes that the coating comprises two outermost layers: An opaque or translucent color layer, covered by a smooth transparent clear coat layer. The color layer may contain highly reflective effect particles (so-called "flakes"). Incoming light with direction i is refracted into the clear coat layer before it hits the color layer along a "refracted" incoming direction $\bar{\imath}$. Reflected light propagates through the clear coat layer along an outgoing direction $\bar{o}$ before being refracted into the surrounding air in a direction o. Refraction is modeled by standard geometrical optics, assuming a typical index of refraction for the clear coat layer.

The appearance model of the color layer is separated into three parts:
(a) A monochromatic brightness BRDF part, which models the spatially and wavelength-averaged overall reflection behavior (brightness variation) of the material. The brightness BRFD part may show high frequencies in the angular domain.
(b) A spectral part in the form of a discrete color table, which describes low-frequency angular variations of color (color shifts).
(c) A BTF part in the form of a texture table, which captures the effect of reflecting flakes in the color layer. The BTF part is represented by a plurality of fixed-size images, each image being representative of texture at a particular combination of illumination and viewing angles.

The three parts are combined into one spatially-varying BRDF function representing the appearance of the paint surface, as follows:

$$f_{total}(i,o,x)=(1-F(n,i,\eta))(1-F(n,o,\eta))(f_{mono}(\bar{\imath},\bar{o})$$
$$C(\bar{\imath},\bar{o})+B(\bar{\imath},\bar{o},x))+F(n,i,\eta)\delta(i,r(n,o))$$

Here,
i designates the direction of incident light in air,
the direction of reflected light in air,
x the location on the object surface,
n the surface normal at location x,
$\bar{\imath}$ the (refracted) direction of incident light in the clear coat layer,
$\bar{o}$ the (refracted) direction of reflected light in the clear coat layer,
$F(n,d,\eta)$ a function to approximate the Fresnel reflection at medium boundaries of relative refractive index $\eta$ (or the Fresnel formulas themselves),
$f_{mono}(\bar{\imath},\bar{o})$ the monochromatic BRDF model, see subsequent section (a),
$C(\bar{\imath},\bar{o})$ the interpolated color table, see subsequent section (b),
$B(\bar{\imath},\bar{o},x)$ the interpolated texture table, see subsequent section (c),
$\delta(d_1, d_2)$ the Dirac delta function on O(3), being nonzero only if $d_1=d_2$, and
$r(n, d)$ the direction d reflected at a surface of normal n.
(a) Example of Brightness BRDF Part The monochromatic brightness BRDF part is modeled using a multi-lobe microfacet-based BRDF model:

$$f_{mono}(\bar{\imath}, \bar{o}) = \frac{a}{\pi} + \sum_{k=1}^{K} \frac{s_k}{\pi} \frac{D_{\alpha_k}(\bar{h})F(\bar{h}, \bar{\imath}, F_{0,k})G(\bar{h}, \bar{\imath}, \bar{o})}{\bar{\imath}_z \bar{o}_z}$$

Here, $\bar{h}$ designates the direction halfway between I and a (also referred to as the "halfway vector"), a designates the diffuse albedo, K designates the number of BRDF lobes, $s_k$ designates the multiplier for the k-th lobe, D designates a microfacet normal distribution function according to the chosen model, $\alpha_k$ designates the coarseness parameter for the k-th lobe, $F_{0,k}$ designates the parameter for the Fresnel function for the k-th lobe, which might be an index of refraction ratio or the reflection at normal incidence, and G designates a so-called geometry term according to the chosen model.

In some embodiments, the Cook-Torrance BRDF model with the Schlick-Fresnel approximation is used. Here, D, F, and G are defined as follows:

$$D_{\alpha_k}(\bar{h}) = \frac{\exp\left(-\frac{\tan^2\theta_h}{\alpha_k^2}\right)}{\pi \alpha_k^2 \cos^4 \theta_h}$$

$$F(n, d, F_{0,k}) = F_{0,k} + (1 - F_{0,k})(1 - \langle n, d \rangle)^5$$

$$G(\bar{h}, \bar{i}, \bar{o}) = \min\left(1, 2\frac{\bar{h}_z \bar{o}_z}{\langle \bar{o}, \bar{h} \rangle}, 2\frac{\bar{h}_z \bar{i}_z}{\langle \bar{o}, \bar{h} \rangle}\right)$$

Here, $\theta_h$ designates the polar angle of the halfway vector $\bar{h}$ in an object-fixed reference frame in which the surface normal n defines the z axis ("north pole"), $\bar{h}_z, \bar{o}_z$ and $\bar{i}_z$ designate the z components of the vectors $\bar{h}$, $\bar{o}$ and $\bar{i}$, respectively, in said reference frame.

The free parameters of the model are a, $s_k$, $\alpha_k$, and $F_{0,k}$ for k=[1 ... K]. Typically, K is chosen to be between 1 and 3.

(b) Example of Spectral Part

The spectral part is modelled by a discrete color table that comprises values of one or more color attributes (e.g., hue and saturation) for a plurality of combinations of directions. The values of the color attributes will in the following be called "color values" for short. Advantageously, the Rusinkiewicz parameterization [Rus98] is employed for indicating directions. In simple embodiments, the color table is bivariate, i.e., the value of the color attribute depends only on the polar angles in the Rusinkiewicz parameterization, as will be explained in the following. These polar angles will in the following also be called the "coordinates" of the color table.

Figure 6:
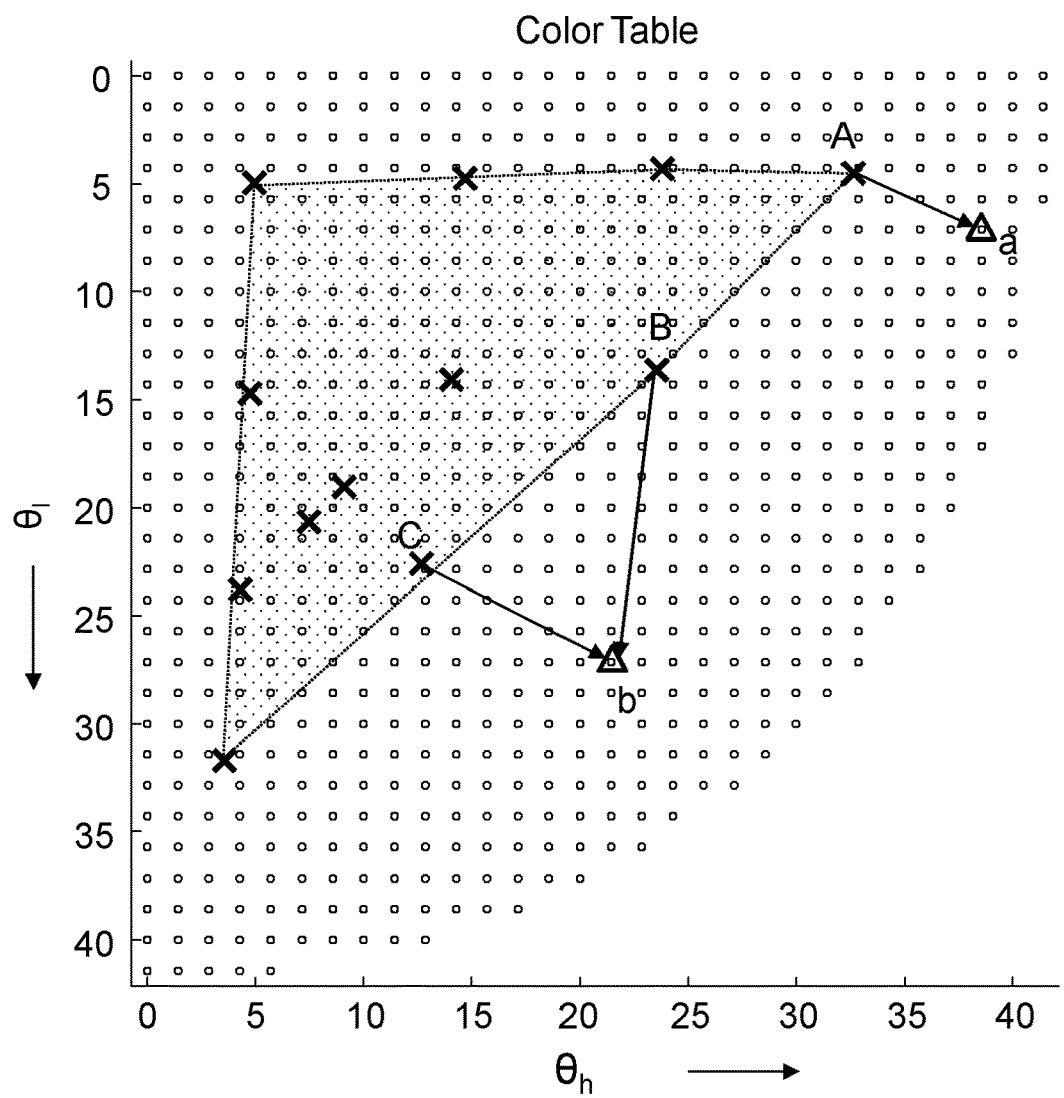
FIG. 6 shows a diagram illustrating an exemplary discrete color table.

An exemplary representation of a bivariate discrete color table is shown in FIG. 6. On the horizontal axis, the polar angle $\theta_h$ of the halfway vector $\bar{h}$ is used as a first coordinate. This polar angle is also called the "flake angle" because it defines the angle between the surface normal n of the paint layer and the normal of a flake in the paint layer that would cause a reflection of the incoming light from the incoming direction $\bar{i}$ into the outgoing direction $\bar{o}$. On the vertical axis, the polar difference angle $\theta_I$ between the halfway vector $\bar{h}$ and the incoming direction $\bar{i}$ is used as a second coordinate. The polar difference angle $\theta_I$ corresponds to the polar angle of the incoming direction i in a transformed reference frame in which the halfway vector $\bar{h}$ defines the z axis. It may be interpreted as indicating the incoming direction relative to the flake normal. The color table contains one or more color values for each pair of coordinates (i.e., each combination of polar angles $\theta_h$ and $\theta_I$) Each pair of coordinates for which the color table contains one or more color values is represented by a circle in FIG. 6. Such a pair of coordinates (combination of polar angles $\theta_h$ and $\theta_I$) will in the following be called a "position" in the color table. The positions in the color table are regularly spaced. The color table is thus represented by a regular rectangular lattice of positions with their associated color values. The positions of two exemplary entries in the color table are marked as "a" and "b".

The appearance model assumes that the paint material has isotropic reflectance. For isotropic materials, color does not depend on the azimuthal angle $\phi_h$ of the halfway vector in the object-fixed reference frame. Therefore, the color table does not consider the azimuthal angle $\phi_h$.

Furthermore, the model assumes that the effect particles ("flakes") themselves also have isotropic reflectance, and that color shifts are dominated by the specular component of the reflected light. Therefore, color only weakly depends on the azimuthal angle $\phi_I$ of the incoming direction I in the transformed reference frame. For this reason, the color table does not consider the azimuthal angle $\phi_I$ either.

The empty area at large values of $\theta_h$ and $\theta_I$ in the color table of FIG. 6 indicates combinations of "forbidden" angles, which are physically impossible due to refraction and total reflection at the interface of the clear coat layer with the surrounding air. The color table does not contain any color values for these combinations of angles.

(c) Example of BTF Part

The appearance model includes a bidirectional texture function (BTF) model. Generally speaking, a BTF model is a multi-dimensional function depending on planar texture coordinates (x,y) as well as on view and illumination spherical angles. The BTF part is modelled by a discrete texture table. Each entry in the texture table is a texture slice, i.e., an image that is representative of the effect of flakes for a particular combination of illumination and viewing directions. In simple embodiments, the Rusinkiewicz parameterization is also used for the texture table, and the texture table is again bivariate, being again parameterized by the angles $\theta_h$ and $\theta_I$.

Figure 7:
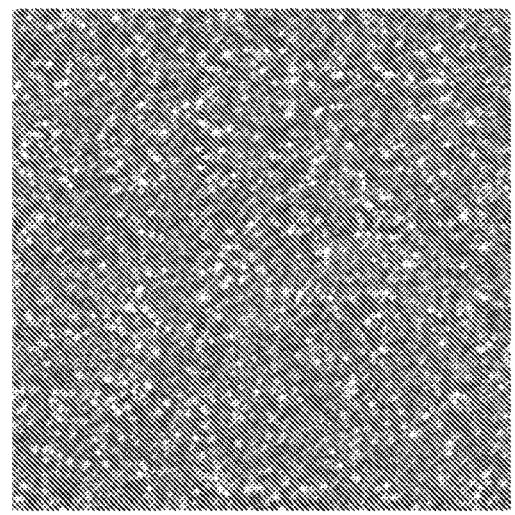
FIG. 7 shows an exemplary texture of a discrete texture table.

A simplified example of a texture slice is shown in FIG. 7. Bright spots in this Figure indicate reflections by flakes whose flake normal is oriented at the associated flake angle $\theta_h$ and which are visible at the associated difference angle $\theta_I$.

Figure 8:
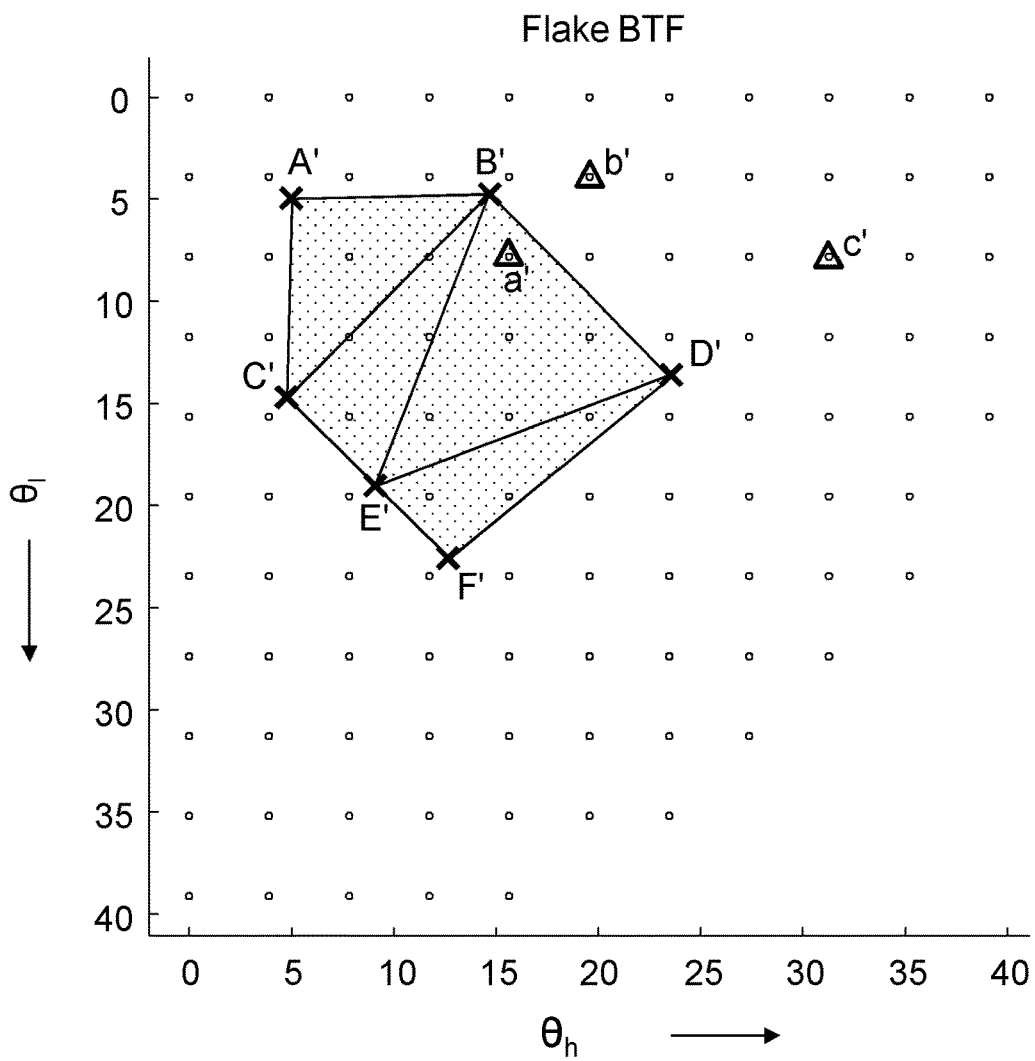
FIG. 8 shows a diagram illustrating an exemplary discrete texture table.

FIG. 8 illustrates the discrete nature of the bivariate texture table. In the appearance model, texture slices are provided for the discrete positions (defined by their coordinates $\theta_h$, $\theta_I$) marked by circles. The spacing between the discrete values of $\theta_h$ and $\theta_I$, respectively, may be larger in the texture table than in the color table on account of the higher storage space requirements for each texture slice as compared to the color values in the color table. As in the color table, for the texture table does not have any entries for the "forbidden" angles. The positions of three exemplary texture slices are marked as a', b', and c'.

Generating an Instance of the Appearance Model

In the presently proposed method, only a limited set of appearance attributes for a limited number of combinations of directions $\bar{i}, \bar{o}$ is available from measurements using a handheld appearance capture device or from formulation software. These appearance attributes are generally not available for the same combinations of directions of incoming and outgoing light as those required by the discrete color and texture tables in the appearance model. Furthermore, the available appearance attributes are not necessarily of the same type as those required by the appearance model. For instance, the available appearance attributes usually do not include the parameters of a monochromatic brightness BRDF model as described above.

For generating an instance of the appearance model, it is therefore necessary to determine the appearance attributes of the appearance model from the limited set of available appearance attributes. It should be noted that the set of appearance attributes of the appearance model may have much larger cardinality than the limited set of available appearance attributes. Therefore, generating an instance of the appearance model may involve inter- and extrapolation.

As already discussed above, the free parameters of the brightness BRDF part are a, $s_k$, $\alpha_k$, and $F_{0,k}$ for k=[1 ... K]. These parameters can be determined using non-linear optimization as known in the art [RMS+08].

Next, the bivariate color table needs to be filled. Color attributes may be available only for a few pairs of angles $\theta_h$ and $\theta_I$, marked by crosses in the diagram of FIG. 6. Each pair of angles ($\theta_h$, $\theta_I$) for which color attributes are available will in the following be called a "sample point". The sample points define a convex hull, shown in FIG. 6 as a dotted area. Each position ($\theta_h$, $\theta_I$) for which color values are required in the bivariate color table will be called a "destination position" having "destination coordinates". In the present example, the destination positions are distributed on a regular grid, and accordingly these positions might also be called "grid points". The color values at the destination positions will be called the "destination color values". They may be in the same format as the available color attributes, or they may be in a different format. For instance, the available color attributes may comprise spectral data, while the color table may comprise reduced values (e.g., trichromatic values like RGB or CIEXYZ, or values in another color space like CIELAB). For the following discussion, it is assumed that a transformation between the format of the available color attributes at the sample points and the format of the color values in the color table is known.

The color values at the destination positions can readily be inter- and extrapolated from the available color attributes at the sample points by standard inter- and extrapolation procedures. If the format of the color values in the color table is different from the format of the available color attributes at the sample points, the necessary transformation can be applied before or after inter-/extrapolation as long as both the available color attributes at the sample points and the color values in the color table are expressed in a linear color space. If the color values in the color table are not expressed in a linear color space (e.g., as CIELAB values), inter-/extrapolation is first carried out in a linear color space, and only then the transformation is applied.

For instance, for interpolation within the convex hull, nearest-neighbor interpolation, inverse distance weighting [Sh68], or Gaussian process regression [VV98] between the color attributes at the available sample points or between color values obtained from these color attributes by said transformation can be used, as it is well known in the art.

In preferred embodiments, for extrapolation at destination positions outside the convex hull having lower $\theta_h$ than the smallest $\theta_h$ of the convex hull or higher $\theta_h$ than the largest $\theta_I$ of the convex hull, the color attributes (or derived color values) at the nearest-neighbor sample point can be used. The nearest-neighbor sample point is to be understood to be that sample point that has the smallest Euclidean distance $\sqrt{\Delta\theta_h^2 - \Delta\theta_I^2}$ from the destination position. In FIG. 6, this is illustrated for destination position "a". The color value at destination position "a" is derived from the available color attributes at sample point A, which is the nearest-neighbor sample point from destination position "a".

For extrapolation at all other destination positions outside the convex hull, in particular, those having low or high $\theta_I$, a preferred embodiment would not only use the nearest-neighbor sample point, but would rather interpolate between the color attributes (or derived color values) of those two sample points that are closest to the destination position. In FIG. 6, this is illustrated by the entry at destination position "b". The two closest sample points are points B and C. The color value at destination position "b" would therefore be determined by interpolation between the color attributes (or derived color values) at sample points B and C.

Of course, other "well-behaved" interpolation and extrapolation methods, as they are known in the art, can be used as well.

Finally, the bivariate texture table needs to be filled. Texture samples in the form of images may be available only for a few pairs of angles $\theta_h$ and $\theta_I$, in the following again referred to as "sample points". For instance, as mentioned above, the appearance capture device 52 may have one or multiple cameras. The available texture samples may be image data for multiple illumination angles and a single viewing angle (e.g., in the case of a single RGB camera) or sets of image data for multiple illumination angles and multiple viewing angles (e.g., in the case of multiple RGB cameras).

In the example of FIG. 8, only six texture samples are available. The corresponding sample points are marked by crosses in FIG. 8 and labelled as A', B', C', D', E' and F'. The convex hull of these sample points is again shown as a dotted area. The texture samples at the sample points are called the "source textures". The pairs of angles $\theta_h$, $\theta_I$ for which texture slices need to be determined to fill the bivariate texture table are again called "destination positions" having "destination coordinates". As in the case of the color table, in the present example these points are arranged on a regular grid, and may therefore as well be called "grid points". The texture slices at the destination positions are accordingly called "destination textures". They can be determined from the available source textures as follows:

- For each destination position ($\theta_h$, $\theta_I$) in the texture table, it is determined whether this destination position is inside the convex hull.
- If the destination position is inside the convex hull, the destination texture at this destination position is interpolated from the surrounding source textures using "statistical texture synthesis", as explained in more detail below. For instance, for position a' in FIG. 8, statistical texture synthesis would be used.
- If the destination position is not inside the convex hull, either the source texture of the nearest-neighbor sample point is used for defining the destination texture ("first strategy"), or a constant texture without any spatial variations is used, i.e., an "empty" texture that does not contain any reflections from flakes ("second strategy"). In one possible implementation, the first strategy may be employed for values $\theta_h$ that are smaller than the largest $\theta_h$ of the available sample points, and the second strategy for $\theta_h$ that are larger than the largest $\theta_h$ of the available sample points. For instance, for position b' in FIG. 8, the first strategy would be appropriate, while for position c', the second strategy may be used. It is also possible to use statistical texture synthesis for destination positions that are outside the convex hull as long as at least two sample points are sufficiently close to the destination position. For instance, it may be appropriate to use statistical texture synthesis for destination position b', using the source textures at sample points B' and D'.

Statistical Texture Synthesis

An exemplary embodiment of statistical texture synthesis for destination position a' in FIG. 8 will now be explained with reference to FIGS. 9 to 13.

Initially, three source textures at different sample points are selected for destination position a'. To this end, a Delaunay triangulation is created for all sample points A' to F'. In two dimensions, as in the present example, the result of the Delaunay triangulation is a set of triangles. The edges of the resulting triangles are illustrated by straight lines between the various sample points A' to F' in FIG. 8. Now, the triangle that contains the destination position a' is selected, and the sample points at the corners of this triangle are determined. In the present example, these are the sample points B', D', and E'. For the subsequent procedure, the source textures at these three sample points are used.

Next, interpolation weights for these three source textures are determined. To this end, the absolute barycentric coordinates of the destination position a' with respect to the selected triangle are determined, i.e., non-negative barycentric coordinates $\lambda_1$, $\lambda_2$, $\lambda_3$ fulfilling the condition $\lambda_1+\lambda_2+\lambda_3=1$. These barycentric coordinates are then used as the interpolation weights for the source textures at the corners of the selected triangle. In the example of FIG. 8, the absolute barycentric coordinate with respect to sample point B' is rather large, while the absolute barycentric coordinates with respect to sample points D' and E' are much smaller. Accordingly, the source texture at sample point B' will receive a comparatively large interpolation weight, while the interpolation weights for sample points D' and E' will be much smaller. For all other source textures, the interpolation weight is set to zero.

Now a destination texture is synthesized for the destination position a' from the three source textures at sample points B', D', and E'. This will be explained with reference to FIG. 9.

Figure 9:
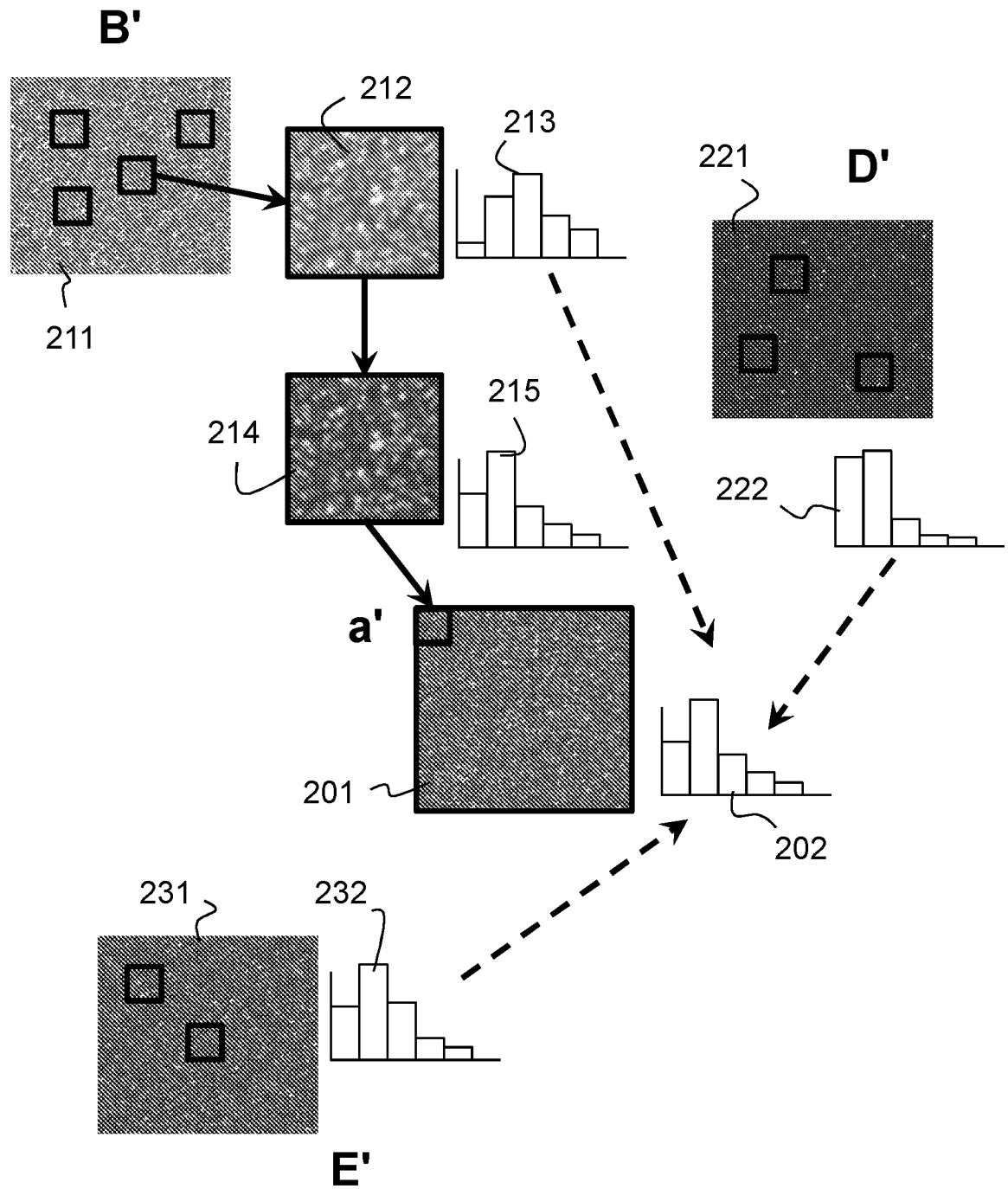
FIG. 9 shows a schematic illustration of a method for generating a destination texture based on a plurality of source textures.

To this end, one of the three source textures is randomly chosen with a probability that is proportional to its interpolation weight. In the example of FIG. 9, the source texture 211 at sample point B' has been randomly chosen.

From this source texture 211, a texture patch, i.e., a small portion of the source texture, is now extracted at a random position within the source texture, indicated by a small rectangle in the source texture. In the example of FIG. 9, texture patch 212 is extracted. The extracted texture patch 212 is now modified so that one of its statistical properties at least approximately matches a corresponding averaged statistical property. In the present example, the extracted texture patch 212 is modified such that its pixel value histogram approximately matches an averaged pixel value histogram 202. This will now be explained in more detail.

Figure 10:
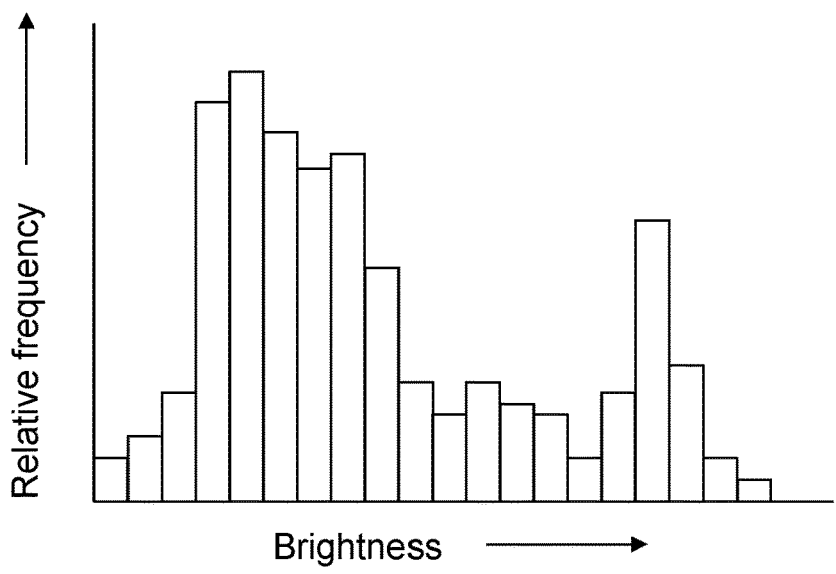
FIG. 10 shows a schematic pixel value histogram.

An exemplary pixel value histogram is illustrated in FIG. 10. The pixel value histogram contains a plurality of relative frequency values, one such value for each discrete pixel value in an image. For instance, if the pixel values range from 0 to 255, the pixel value histogram will comprise, for each pixel value between 0 and 255, the relative frequency of that pixel value in the image. In some embodiments, the pixel values may be binned, each bin corresponding to a range of pixel values, and the pixel value histogram may accordingly comprise a reduced number of relative frequency values, each value representing the relative frequency of pixel values in one of the bins. The pixel value histogram can be used for assessing the distribution of brightness in an image, including overall brightness and contrast. For instance, the pixel value diagram of FIG. 10 would indicate that the image contains some bright spots or areas before a relative dark background.

In FIG. 9, all pixel value histograms are shown in a much-simplified manner as having only five bins each. The pixel value histogram of source texture 211, from which texture patch 212 was extracted, is shown as histogram 213. The averaged pixel value histogram is shown as histogram 202. This averaged histogram has been obtained as a weighted average of the pixel histograms 213, 222, and 232 of the three source textures 211, 221 and 231 at sample points B', D', and E', respectively, the weights being the interpolation weights as determined above. The pixel values of texture patch 212 are now modified so as to obtain a pixel value histogram that more closely matches the average pixel value histogram 202. Modification is carried out by applying a monotonically non-decreasing point-wise transformation to each pixel value in texture patch 212. Histogram-matching algorithms for finding a suitable transformation are well known in the art of digital image processing in connection with brightness and contrast modification. The modified texture patch is illustrated as texture patch 214, and the resulting pixel value histogram is illustrated as histogram 215. The resulting pixel value histogram 215 now closely matches the averaged pixel value histogram 202.

The modified texture patch 214 is now inserted into the destination texture 201 so that it seamlessly fits to the texture content already in the destination texture 201. To this end, the first modified texture patch 214 may simply be placed in a corner of the destination texture 201. Each subsequent texture patch is inserted onto the destination texture by a technique called "MinCut" or "Graphcut". Reference is made to document [Kw03]. Very briefly stated, a seam that enforces visual smoothness between the existing pixels and the newly placed patch is computed. The texture patch and the already existing content are stitched together along this seam.

Figure 11:
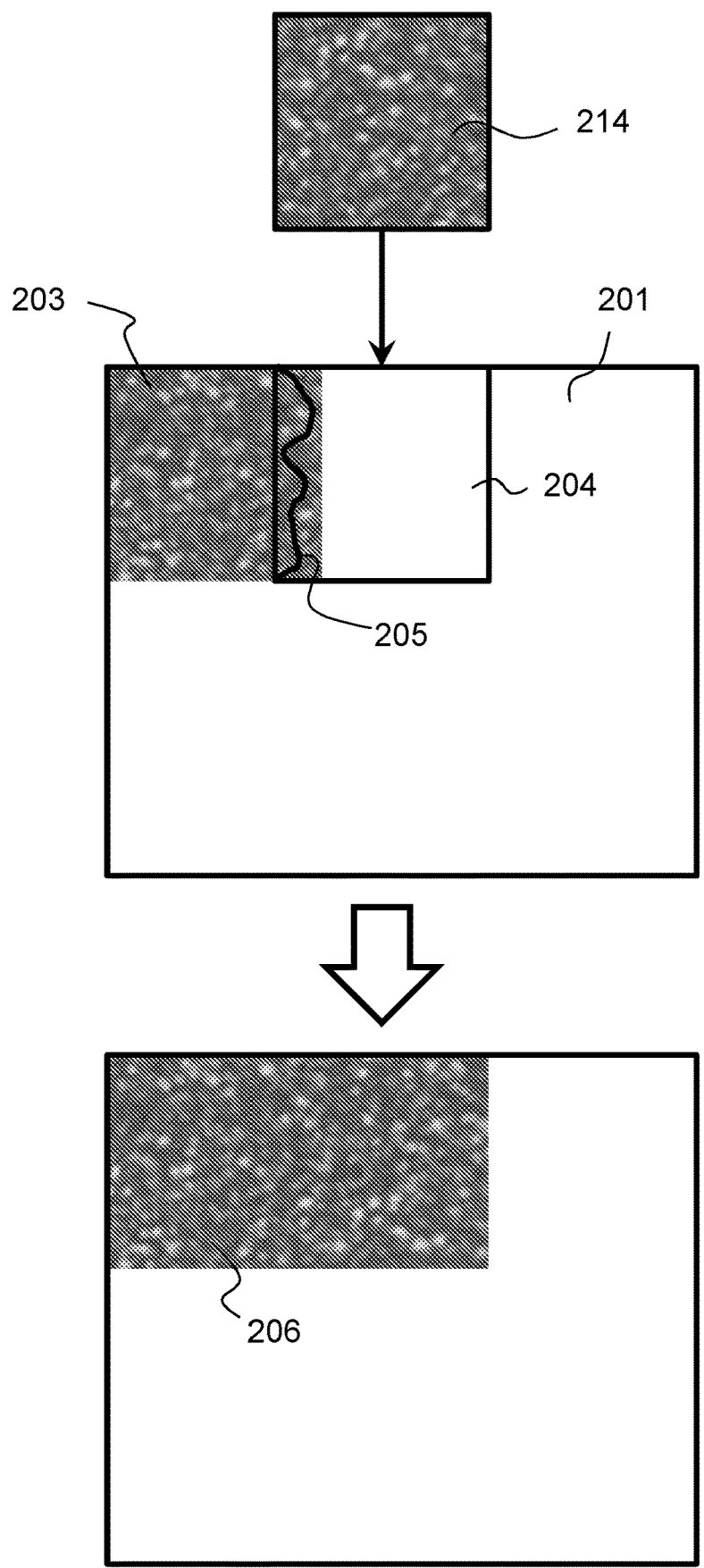
FIG. 11 shows a schematic illustration of the insertion of a texture patch into the destination texture.

One such insertion step is illustrated in FIG. 11. In this example, a modified texture patch 214 is to be inserted into a destination texture 201 that already comprises a texture patch 203. The position 204 of the newly inserted patch 214 is chosen such that the newly inserted patch 214 overlaps with the existing patch 203. A seam 205 is computed in the region of overlap such that the existing pixels along the seam and the newly inserted pixels appear to be visually smooth, i.e, that no visible boundary is created along the seam, as explained in detail in [Kw03]. The existing patch 203 and the newly inserted patch 214 are stitched together along this seam, the remainder of each patch being discarded. This results in a larger patch 206.

This procedure is now repeated as often as necessary to completely fill the destination texture 201.

Flow Diagram for Filling a Discrete Texture Table

Figure 12:
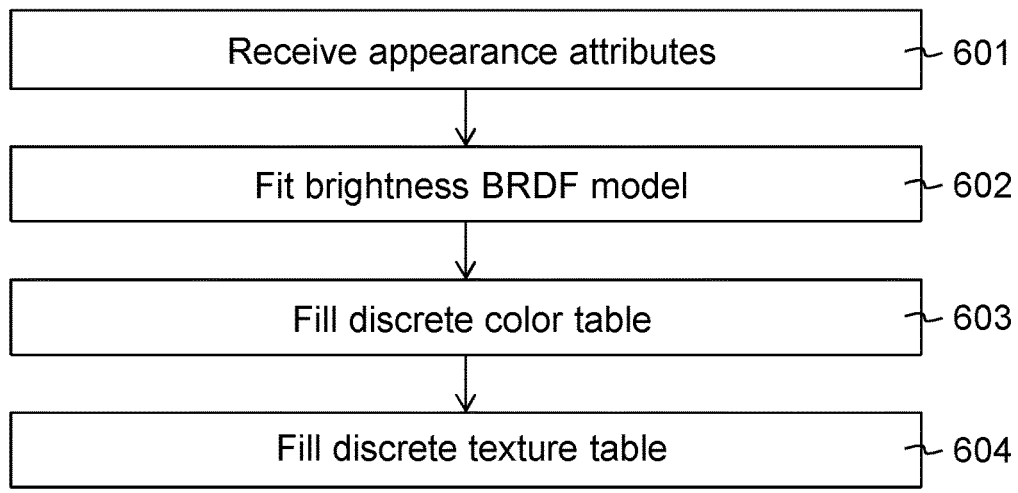
FIG. 12 shows a flow diagram of a method for generating an instance of an appearance model.

FIG. 12 shows a flow diagram that illustrates an exemplary procedure of generating an instance of the appearance model. In step 601, the model generation software receives the set of available appearance attributes, which may have been determined by an appearance capture device measuring a target object 50 or by formulation software determining constituents of a candidate formula 60, including the constituents' proportional amounts in the candidate formula 60. In step 602, the software carries out a fit of the brightness BRDF model to the available appearance attributes. In step 603, the software fills the discrete color table, based on the available appearance attributes. In step 604, the software fills the discrete texture table, based on the available appearance attributes. To this end, it determines the destination textures that form the entries of the discrete texture table.

Flow Diagram for Statistical Texture Synthesis

Figure 13:
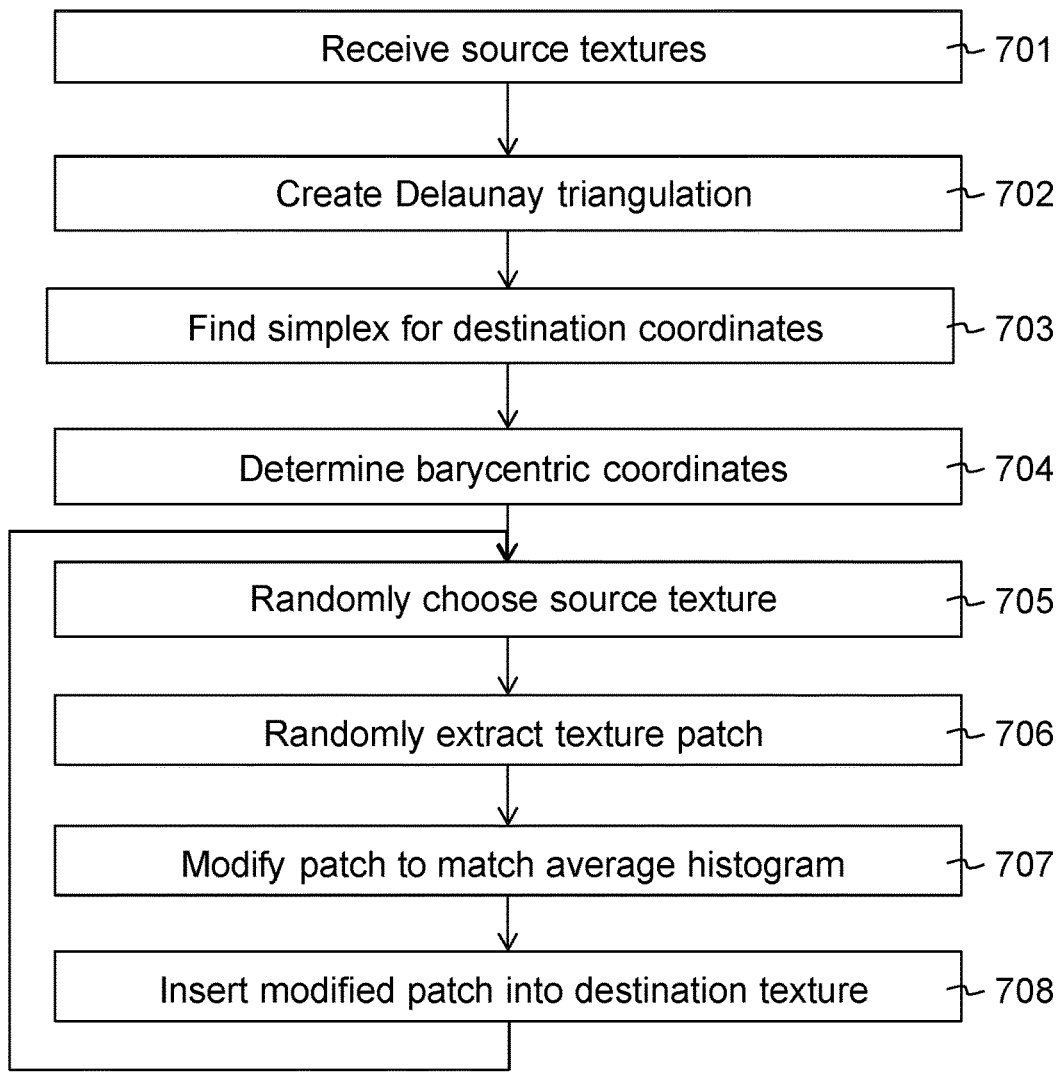
FIG. 13 shows a flow diagram of a method for generating a destination texture based on a plurality of source textures; associated with different source coordinates.

FIG. 13 shows a flow diagram that illustrates an exemplary procedure of determining a destination texture associated with a set of destination coordinates. In step 701, the model generation software receives a plurality of source textures and their associated coordinates. In step 702, the software creates a Delaunay triangulation. In step 703, the software identifies that simplex of the Delaunay triangulation that contains the destination coordinates. In step 704, the software determines the barycentric coordinates of the destination coordinates with respect to the identified simplex and stores these as interpolation weights. In step 705, the software randomly chooses one of the source textures at the corners of the selected simplex with a probability according to its interpolation weight. In step 706, the software randomly extracts a texture patch from the chosen source texture. In step 707, the software modifies the patch to match its pixel value histogram to an average pixel value histogram. In step 708, the software inserts the modified patch into the destination texture such that it seamlessly fits the existing texture content in the destination texture. Steps 705 to 708 are repeated until the destination texture is completely filled. The completed destination texture may then be used as an entry in the discrete texture table.

Computing the Texture Table of a Composite Material

When computing the entries of a discrete texture table for a composite material that is a mixture of several constituents (e.g., of a candidate material that is a mixture of constituents according to a recipe determined by formulation software), statistical texture synthesis may be likewise employed. In this case, the source patches may be randomly sampled from source textures associated with the different constituents with probabilities according to their concentrations in the mixture.

Figure 14:
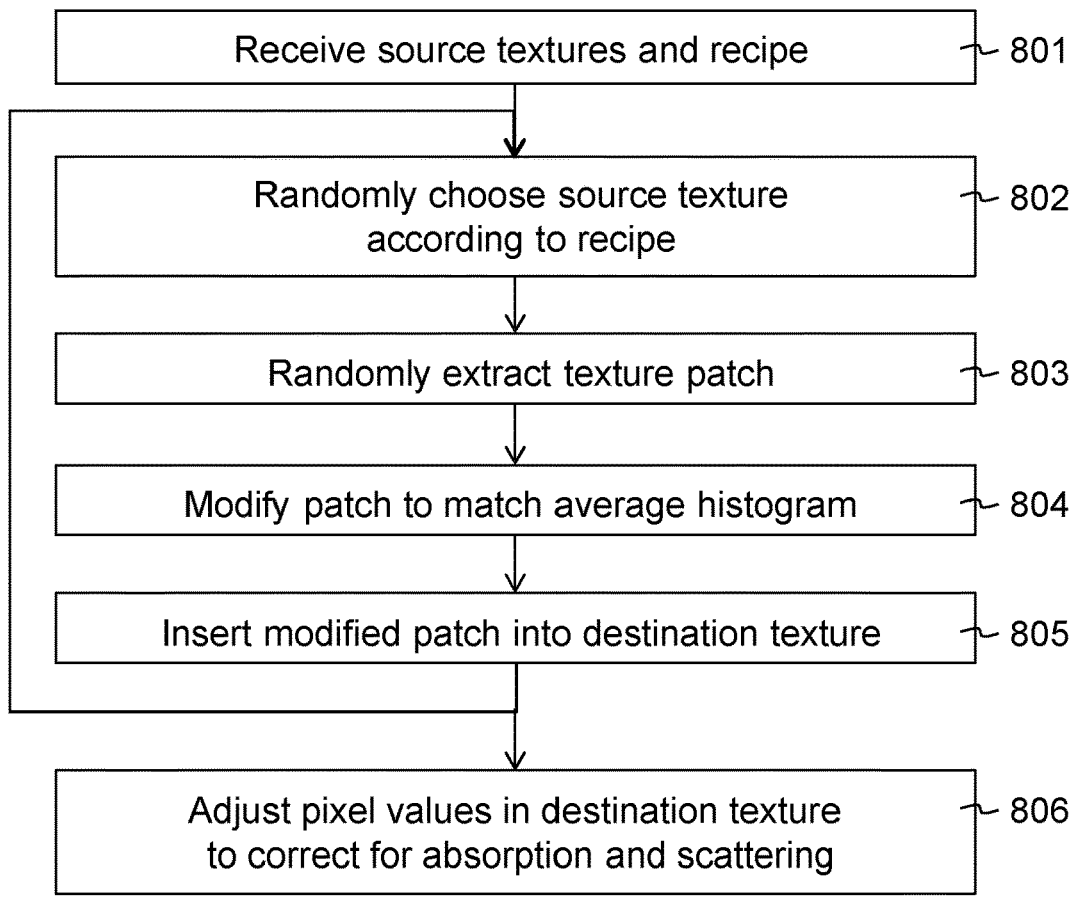
FIG. 14 shows a flow diagram of a method for generating a destination texture based on a plurality of source textures associated with different constituents.
Figure 15:
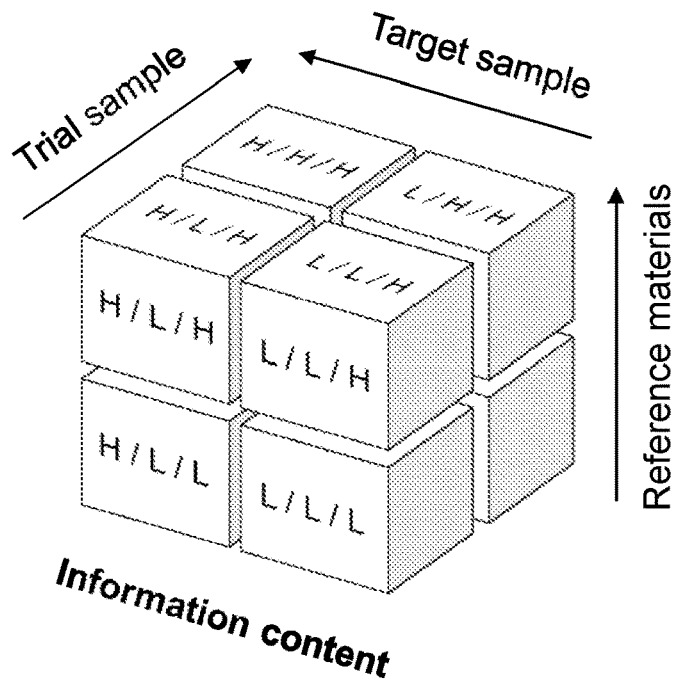
FIG. 15 shows a schematic diagram illustrating variations in information content along three dimensions.

This is illustrated in FIG. 14. In step 801, the model generation software receives at least two source textures and a recipe. Each source texture is associated with one constituent of the composite material. In step 802, the software randomly chooses one of the source textures with a probability according an interpolation weight that reflects the concentration of that constituent in the composite material. In step 803, the software randomly extracts a texture patch from the chosen source texture. In step 804, the software modifies the patch to match its pixel value histogram to an average pixel value histogram. In step 805, the software inserts the modified patch into the destination texture such that it seamlessly fits the existing texture content in the destination texture. Steps 802 to 805 are repeated until the destination texture is completely filled. The completed destination texture may then be used as an entry in the discrete texture table.

Taking Absorption and Scattering in Composite Materials into Account

In some cases, when computing textures of a material that is a mixture of several constituents, the statistical texture synthesis operation delivers a destination texture that does not match the texture that would be obtained if a measurement of the actual material was carried out. In particular, the perceived average color and/or brightness might not be matched perfectly.

This is at least partly due to the fact that, in practice, the source textures of the individual constituents are often based on measurements of samples that comprise an effect pigment in a clear base material, while the actual mixture may contain non-effect pigments (toners) as well. The statistical texture synthesis procedure described above does not take into account that the pigments partly absorb light, preventing some of the incident the light from reaching the effect pigment and some of the reflected light from reaching the observer.

In order to correct for this effect, two approaches may be considered.

The first approach is a simple heuristic approach. In this approach, an adjustment of the pixel values in each destination texture is carried out so as to match at least one statistical property of the destination texture with a corresponding benchmark property. The statistical property to be matched to a benchmark property may be, in particular, average brightness and/or average color. Preferably, color values, averaged over the area of the destination texture, are matched to benchmark color values. The benchmark color values may be known from a different source. For instance, these benchmark properties may be known from a simple color measurement (without image acquisition) of a target or trial object, or the benchmark properties may have been calculated using a formulation engine that does not take texture into account, but is known to be very accurate in predicting color.

The matching is preferably carried out in a perceptual color space, in particular, in a perceptually uniform color space, which seeks to make color attributes perceptually uniform, i.e. identical spatial distance between two colors in the color space equals identical amount of perceived color difference. An example of a perceptual color space is the well-known CIELAB color space. Using a perceptual color space has proven to deliver results that better match measurements than if a non-perceptual color space such as CIEXYZ is used.

In the adjustment procedure, for a given geometry k and for each coordinate in the color space, pixel values in the corresponding destination texture are adjusted in such a manner that the average value (e.g., $L^*$, $a^*$ or $b^*$) along said color coordinate over the texture area matches the corresponding benchmark value. This may be done by multiplying each pixel value by the ratio between the benchmark value and the average value as calculated before the adjustment. This procedure may be repeated for each geometry that is required to define an instance of the appearance model.

If a benchmark color is not available at a specific geometry for which the adjustment of the destination textures is to be carried out, the missing benchmark color may be calculated using an appearance model. Specifically, a fit of the parameters p of a BRDF model $f(p; \omega_i, \omega_o)$ may be carried out, using those geometries for which a benchmark color is available. The BRDF model is then evaluated at an arbitrary geometry $\{(\omega_i^k, \omega_o^k)\}_k$ to predict a benchmark color $c_k = f(p; \omega_i^k, \omega_o^k)$ for that geometry.

The second approach is motivated by physics and is more complex than the simple, heuristic first approach. The second approach has the following prerequisites:

The concentration of non-effect pigments (toners) in the material whose texture is to be predicted should be known.

Optical parameters that describe the scattering and absorption behavior of the non-effect pigments should be known, e.g. scattering coefficient as and absorption coefficient $\sigma_a$.

The formulation engine should be able to determine combined scattering and absorption coefficients $\sigma_s$, $\sigma_a$ based on the concentrations of non-effect pigments and their individual scattering and absorption coefficients.

The formulation engine then carries out an optical simulation of the light flux within the material. This flux is typically described as a set of connected differential equations, each describing the flux into a certain set of directions for the depth x in the paint layer:

$$F_i(x)$$

Here i is the index of one such set of directions (may be upward or downward). These differential equations are coupled through scattering effects of the toners or the paint layers boundaries.

During normal operation of the formulation engine, the user is interested in the upward light flux putting in place boundary conditions describing the incident light. This way, a measurement device is simulated, and the simulated light flux can be compared to the measurement values of a real device.

However, the solution of the differential equation with respect to the boundary conditions is also valid at arbitrary depth x. That is, the solution can be used to compute for a given relative depth what the incident flux on the effect pigments will be by evaluating the solution for a downward set of directions $i_1, i_2, \ldots i_n$. By computing an integral over these directions, an attenuation $A(x)$ of the incident light can be computed. Assuming reciprocity, one may assume that the same attenuation applies also to the light reflected by the effect pigments.

The pixel values $T_p$ of a given destination texture along each coordinate of the color space may therefore be adjusted by multiplying each pixel value by $A^2(x)$ if the depth x is known or can be estimated. For instance, in simple embodiments, one may assume that the effect pigments are buried in the material at an average depth x. For instance, if the material is a paint coating, the average depth may readily be estimated based on the thickness of the paint coating. In more complex embodiments, a distribution of $A^2(x)$ over a depth profile may be computed.

Both approaches are illustrated in FIG. 14 as step 804. In this step, pixel values in the destination texture are adjusted to correct for absorption and scattering.

Combinations of Different Appearance Capture Devices

In the above-discussed workflow, appearance attributes of three types of objects are determined by measurements: the target object, the trial object, and the reference objects that have been produced for the various reference materials. These measurements will generally take place at different locations. For instance, in the case of vehicle repair, measurements on the target object are carried out in a body shop, measurements on the trial object will generally be carried out by the paint supplier, and measurements of drawdowns for the reference materials will generally be carried out in a paint development lab.

Accordingly, these measurements will generally not be carried out by the same appearance capture device. If the same type of appearance capture device is used for measurements of all three types of objects, only inter-instrument calibration is required. However, generally different types of appearance capture device may be used at the different locations, possibly with different degrees of sophistication. For instance, the body shop might use only a relatively simple handheld multi-angle spectrophotometer without imaging capabilities, such as X-Rite's MA-5 instrument, for measuring the target object, while the paint supplier might use a more sophisticated handheld multi-angle spectrophotometer with imaging capabilities, such as X-Rite's MA-T6 or MA-T12 instruments, for measuring the trial object, and the paint development lab might determine the properties of the reference materials using a highly sophisticated stationary appearance capture device like X-Rite's TAC7 instrument, having a large number of illumination and viewing directions and highly sophisticated imaging capabilities.

Accordingly, the available information content associated with the three types of objects may be different. This is illustrated in FIG. 14, which schematically illustrates variations in information content along three dimensions: The first dimension is the available information content for the target object, the second dimension is the available information content for the trial object, and the third dimension is the available information content for the reference materials. The available information content may vary along each of these dimensions between "L" ("low", color attributes available for only a small number of combinations of illumination and viewing directions, no texture attributes available) and "H" ("high", both color attributes and texture attributes available, each for a large number of combinations of illumination and viewing directions).

Possible strategies for dealing with different levels of information content will now be discussed.

(a) Information Content is High for Target Object, Trial Object and Reference Materials (Box "H/H/H" in FIG. 14)

Ideally, the information content is high for each of the three dimensions, i.e., color attributes for a large number of combinations of illumination and viewing directions as well as texture attributes in image form for a considerable number of combinations of illumination and viewing directions are available for the target material, for the trial material and for each reference material. In this case sufficient information is directly available for visualizing the appearance of the target material based on the measured appearance attributes of the target object and for generating a first instance of the appearance model to this end. There is also sufficient information for determining a suitable candidate recipe for which a good match with the appearance of the target material is expected, for visualizing the appearance of the candidate recipe based on the available appearance attributes of the reference materials, and for generating a second instance of the appearance model to this end. Finally, there is also sufficient information for visualizing the trial material and for generating a further instance of the appearance model to this end, and for evaluating whether the appearance of the trial material actually matches the appearance of the target material by determining a suitable difference norm and/or by visually comparing the visualizations of the target material and the trial material.

(b) Information Content is Low for Target Object, but High for Trial Object and Reference Materials (Box "L/H/H" in FIG. 14)

In some embodiments, measurements on the trial object and the reference objects are carried out using appearance capture devices that have both spectrophotometric and imaging capabilities (i.e., the associated information content is high), while measurements of the target object are carried out using a simpler device that only has spectrophotometric capabilities, but no imaging capabilities (i.e., the associated information content is low). Then the problem arises how to visualize the appearance of the material of the target object in a realistic manner despite the absence of measured texture attributes for this material.

In this case there are at least two conceivable strategies. In a simple strategy, the entire virtual object is simply visualized without texture. To this end, the first and second instances of the appearance model may both be generated with an "empty" texture table, i.e., with a texture table whose entries are all identical and do not exhibit any spatial variations. Equivalently, an appearance model that does not include texture may be used for visualizing the virtual object.

However, this procedure might not yield a reasonably realistic impression of the appearances of the materials of the target object and of the candidate recipe, and therefore it may be difficult to judge whether these appearances actually match.

Therefore, in a preferred strategy, the texture of the target object is predicted based on the known texture attributes associated with the reference materials. Once a trial object has been produced, texture prediction for the trial object may additionally be based on the texture attributes of the trial object. In other words, texture information associated with the reference materials and/or the material of the trial object is used to visualize the appearance of the target material. To this end, the first instance of the appearance model may be "edited" using texture information that belongs to another instance of the appearance model, i.e., texture information associated with the target material is replaced or modified by texture information associated with a different material. Methods for "editing" an appearance attributes in this manner are described in US20150032430A1, the contents of which are incorporated herein by reference in their entirety.

Similar strategies may also be used if a limited number of texture attributes are available for the target material, these texture attributes however being insufficient for generating the texture part of the first instance of the appearance model in a meaningful manner or containing less texture information than the texture information that is available for the reference materials and/or for the trial object. For instance, the first appearance capture device may be a multi-angle spectrophotometer that is configured to determine color attributes and only one or a few global texture attributes, e.g., a global coarseness parameter or a global sparkle parameter. In contrast, the available texture attributes for the reference materials and/or for the trial object may include image data for several combinations of illumination and viewing directions. In this case, the texture attributes associated with the target object may be modified to include image data derived from the available image data of the reference materials and/or of the trial object. The image data that will be associated with the target object should of course be consistent with the available measured texture attributes of the target object, e.g., with measured global parameters such as coarseness or sparkle parameters. This may be ensured by appropriately modifying pixel values in the available image data of the reference and/or trial materials such that a global parameter computed from the modified image data corresponds to the measured global parameter, respectively, of the target object.

The methodology for modifying the pixel values may be very similar to the above-described methodology in the context of statistical texture synthesis, where a texture patch is modified such that its pixel value histogram approximately matches an averaged pixel value histogram. It is noted that both a pixel value histogram and a global coarseness or sparkle parameter represent examples of statistical properties associated with image data. Similarly to the above example of statistical texture synthesis, also in the present example an image is modified such that one of its statistical properties (here: a global parameter computed from the image data) approximately matches a measured statistical property of the target object (here: a measured global parameter of the target object).

The limited texture attributes that are measured for the target object may also be different from a global parameter. For instance, the measured texture attributes may comprise one single image for one single combination of illumination and viewing directions. Regardless of the exact nature of the measured texture attributes, additional images for the target material may be generated by modifying pixel values of the available images associated with the target material, the reference materials and/or the trial object in such a manner that at least one statistical property of the modified image data approximates a corresponding statistical property associated with the measured texture attributes of the target object.

The suggested procedure of texture prediction is based on the assumption that the texture of the target material will be reasonably similar to the texture of the candidate recipe as long as the ingredients of the candidate recipe belong to the same class of materials as the ingredients of the target material. For instance, if it is known that the target material comprises a certain type of flakes, and if the candidate recipe includes such a type of flakes, it is reasonable to assume that the texture of the target material will at least be close to the texture of the candidate recipe.

Similar strategies may also be employed if the available color attributes of the target material are insufficient for reliably fitting the color attributes required by the used appearance model. This may be the case, for instance, if the used multi-angle spectrophotometer has an insufficient number of pairs of illumination and viewing directions for determining the color attributes of the target material. In this case, also the color attributes of the appearance model may be determined by "editing", using procedures as disclosed in US20150032430A1, in a similar manner as the above-described editing process for texture attributes.

(c) Information Content is High for Target Object and Reference Materials, but Low for Trial Object (Box "H/L/H" in FIG. 14)

In some embodiments, image-based texture information is available for the target material and the reference materials, but no or only limited texture information (e.g., one or more global texture parameters or image information for only one pair or illumination and viewing directions) is available for the trial object. In this case, similar strategies as in case (b) can be pursued. In particular, the texture of the trial material may be predicted based on the known texture attributes associated with the target material and/or with the reference materials.

(d) Information Content is Low for Target Object and Low for Trial Object, but High for Reference Materials (Box "L/L/H" in FIG. 14)

In some embodiments, image-based texture information is only available for the reference materials, while no or only limited texture information is available for the target object and for the trial object. In this case, again similar strategies as in case (b) can be pursued. In particular, the textures of the target material and the trial material may be predicted based on the known texture attributes associated with the reference materials.

(e) Information Content is High for Target Object and Trial Object, but Low for Reference Materials ("H/H/L", not Visible in FIG. 14)

In some embodiments, image-based texture information is available for both the target object and the trial object, but no texture information or only limited texture information is available for the reference materials. This may be the case, for instance, if a relatively old colorant database is used, which was filled at a time when only less sophisticated instrumentation was available, while more modern appearance capture devices are available for measuring the target material and the trial material.

In such a situation, the texture information of the target object and/or of the trial object (once the trial object has been produced) may be used to visualize the appearance of the candidate recipe. To this end, the associated second instance of the appearance model may be "edited", using texture information that belongs to the target material and/or to the trial material. This can be done in very much the same way in which the first instance of the appearance model is edited in case (b) discussed above.

It is advantageous to use the texture attributes of the trial object for visualizing the candidate recipes once these texture attributes are available, since it can safely be assumed that the relatively small differences between the composition of further candidate recipes and the trial material will influence texture only negligibly.

(f) Information Content is Low for Target Object and Reference Materials, but High for Trial Object ("L/H/L", not Visible in FIG. 14)

If image-based texture information is available for the trial material, while no or only limited texture information is available for the target material and the reference materials, the virtual object may be visualized without texture or using some generic textures as long as the trial object is not yet available. Once the trial object is available, the texture attributes of the trial object may then be used for visualizing the target material and the candidate recipes. To this end, the texture attributes in the associated instances of the appearance models may be edited as described for case (b) above.

(g) Information Content is High for Target Object, but Low for Trial Object and Reference Materials (Box "H/L/L" in FIG. 14)

If image-based texture information is available for the target material, while no or only limited texture information is available for the trial material and for the reference materials, a similar strategy as for case (e) above may be pursued. Texture information of the target object may be used to visualize the appearance of the candidate recipe and the appearance of the trial object. To this end, the associated instances of the appearance model may be "edited", using texture information that belongs to the target material.

(h) Information Content is Low for Target Object, Trial Object, and Reference Materials (Box "L/L/L" in FIG. 14)

If no image-based texture information is available for any of the objects, the virtual object may be simply visualized without texture or using a generic texture for the class of materials to which the target object belongs.

REFERENCES

[Ber19] Roy S. Berns, "Billmeyer and Saltzman's Principles of Color Technology", 4th edition, Wiley, 2019, p. 184

[Kw03] Kwatra, V., Schödl, A., Essa, I., Turk, G. and Bobick, A., "Graphcut textures: image and video synthesis using graph cuts", *ACM Transactions on Graphics (ToG)*, 2003, 22(3), pp. 277-286.

[MTG+19] Gero Müller, Jochen Tautges, Alexander Gress, Martin Rump, Max Hermann, and Francis Lamy, "AxF— Appearance exchange Format", Version 1.7, Apr. 11, 2019, available upon request from X-Rite, Inc.

[RMS+08] Martin Rump, Gero Müller, Ralf Sarlette, Dirk Koch and Richard Klein, "Photo-realistic Rendering of Metallic Car Paint from Image-Based Measurements", In: R. Scopigno, E. Gröller (eds.), Computer Graphics Forum, Eurographics, April 2008, 27:2 (527-536)

[RSK09] Martin Rump, Ralf Sarlette and Richard Klein, "Efficient Resampling, Compression and Rendering of Metallic and Pearlescent Paint", In: M. Magnus, B. Rosenhahn, H. Theisel (ed.), Proceedings of Vision, Modeling, and Visualization, November 2009, pp. 11-18

[Rus98] Szymon M. Rusinkiewicz, "A New Change of Variables for Efficient BRDF Representation", In: G. Drettakis G., N. Max (eds.), Rendering Techniques '98, Eurographics, Springer, Vienna, 1998, https://doi.org/10.1007/978-3-7091-6453-2_2

[Sh68] Shepard, D., "A two-dimensional interpolation function for irregularly-spaced 30 data", In: Proceedings of the 1968 23rd ACM national conference, 1968, pp. 517-524

[W98] Williams, C. K., "Prediction with Gaussian processes: From linear regression to linear prediction and beyond". In: Learning in graphical model, Springer, Dordrecht, 1998, pp. 599-621.

LIST OF REFERENCE SIGNS

1, 2 gripping part
3 wrist strap
4 display array
5 housing base
6 measurement opening
7 base plate
7a, 7b, 7c support member
10 arc body
21, 22, 23, 24, 25, 26, 27, 28 illumination means
31, 32, 33 pick-up means
31a, 32a spectrometer
33a RGB camera
31c, 32c optical fiber
50 target object
52 appearance capture device
54, 64 appearance attributes
56, 66 instance of appearance model
60 candidate recipe
70 display
72 virtual object
72a, 72b, 72c portion
74, 76 virtual separating line
80 trial object
82 appearance capture device
90 pointing device
102 model generation software
104 formulation software
106 database (colorants and recipes)
108 rendering software
110 database (geometric data)
201 destination texture
211, 221, 231 source texture
203, 206, 212, 214 texture patch
202, 213, 215, 222, 232 pixel value histogram
204 position
205 seam
300 client computer
310 processor
320 non-volatile memory
321 operating system software
330 RAM
340 I/O interface
350 communication interface
360 server computer
501-513 steps
601-604 steps
701-708 steps 801-806 steps
HMD hand-held measurement device
H housing
DN device normal
SP system plane
A, B, C sample point (color)
a, b destination position (color table)
A', B', C', D', E', F' sample point (texture)
a', b', c' destination position (texture table)

The invention claimed is:

1. A computer-implemented method for generating a destination texture from at least two source textures, the method comprising carrying out a statistical texture synthesis operation comprising:
   (i) assigning an interpolation weight to each of the source textures; and
   (ii) synthesizing the destination texture using the source textures and the assigned interpolation weights,
   wherein synthesizing the destination texture comprises:
   (a) randomly choosing one of the source textures where a probability of choosing a given source texture is proportional to its interpolation weight;
   (b) extracting a texture patch from the chosen source texture at a random position within the chosen source texture;
   (c) modifying the extracted texture patch by modifying pixel values in the extracted texture patch to obtain a modified texture patch, modification of the pixel values being carried out in such a manner that at least one statistical property of the modified texture patch approximates a corresponding averaged statistical property, the averaged statistical property being determined by carrying out a weighted average of the at least one statistical property over the source textures, weighted by the interpolation weights;
   (d) inserting the modified texture patch into the destination texture so that the modified texture patch seamlessly fits to existing texture content in the destination texture; and
   (e) repeating steps (a)-(d) until the destination texture is completely filled.

2. The computer-implemented method of claim 1,
   wherein the destination texture is associated with a set of destination coordinates, the set of destination coordinates being indicative of a particular combination of illumination and viewing directions for which the destination texture indicates spatial variations of appearance, and
   wherein each source texture is associated with a different set of source coordinates, each set of source coordinates being indicative of a combination of illumination and viewing directions for which the corresponding source texture indicates spatial variations of appearance.

3. The computer-implemented method of claim 2, wherein assigning an interpolation weight to each of the source textures comprises:
   creating a Delaunay triangulation of the sets of source coordinates;
   finding a simplex in the Delaunay triangulation that contains the set of destination coordinates, the found simplex having a plurality of corners; and
   using, as the interpolation weights for the source textures at the corners of the found simplex, barycentric coordinates of the destination coordinates with respect to the found simplex.

4. The computer-implemented method of claim 1,
   wherein the destination texture is indicative of spatial variations of appearance of a composite material that comprises at least two constituents according to a recipe that defines concentrations of each constituent in the composite material,
   wherein each source texture is associated with one of said constituents, and
   wherein the interpolation weights are assigned to the source textures according to the concentrations of the constituents as defined by the recipe.

5. The computer-implemented method of claim 4, further comprising: generating an adjusted destination texture by additionally adjusting pixel values in the destination texture to correct for effects of absorption and scattering in the composite material.

6. The computer-implemented method of claim 5, wherein the pixel values are adjusted in such a manner that at least one statistical property of the adjusted destination texture matches a benchmark property of the composite material.

7. The computer-implemented method of claim 6, wherein the pixel values are adjusted in such a manner that average color space values of the adjusted destination texture match benchmark color space values of the composite material, the color space values and benchmark color space values preferably being expressed in a perceptual color space.

8. The computer-implemented method of claim 7,
   wherein the destination texture is indicative of the spatial variations of appearance of the composite material for a particular combination of illumination and viewing directions, and
   wherein the method comprises fitting parameters of a BRDF model to benchmark colors at a plurality of other combinations of illumination and viewing directions, and
   evaluating the BRDF model at said particular combination to obtain the benchmark color space values for that particular combination.

9. The computer-implemented method of claim 5, comprising:
   obtaining individual optical parameters that at least approximately describe a scattering and absorption behavior of each constituent in the composite material;
   determining combined optical parameters that describe a scattering and absorption behavior of the composite material, based on the concentrations of the constituents and their individual optical parameters;
   carrying out an optical simulation of light flux within the composite material for at least one layer below a surface of said composite material to determine attenuation factors of incident and reflected light for effect pigments in said layer; and
   adjusting pixel values of the destination texture based on said attenuation factors.

10. The computer-implemented method of claim 1,
    wherein the at least one statistical property of the modified texture patch is a pixel value histogram.

11. The computer-implemented method of claim 1,
    wherein modifying the extracted texture patch comprises applying a monotonically non-decreasing point-wise transformation to the pixel values.

12. The computer-implemented method of claim 1,
    wherein inserting the modified texture patch into the destination texture comprises:

computing a seam that enforces visual smoothness between the existing texture content and the modified texture patch; and stitching together the existing texture content and the modified texture patch along the seam.

13. The computer-implemented method of claim 1, comprising visualizing the destination texture using a display device.

14. The computer-implemented method of claim 1, comprising generating an instance of an appearance model, the appearance model comprising a discrete texture table comprising a plurality of destination textures, each destination texture associated with a different set of destination coordinates, wherein at least one of the destination textures in the discrete texture table is generated by carrying out the statistical texture synthesis operation.

15. The computer-implemented method of claim 14, further comprising:

visualizing, using a display device, a virtual object having a continuous three-dimensional surface geometry, using the instance of the appearance model.

16. The computer-implemented method of claim 14, the method comprising:

determining a set of measured appearance attributes of a first material by carrying out measurements on a target object that comprises the first material, using an appearance capture device;

generating a first instance of the appearance model based on the set of measured appearance attributes of the first material;

determining a recipe of a second material based on the measured appearance attributes of the first material and on predetermined appearance attributes associated with a plurality of reference materials;

generating a second instance of the appearance model based on the recipe and the predetermined appearance attributes associated with the reference materials; and visualizing, using a display device, a scene comprising at least one virtual object, a first portion of the scene being visualized using the first instance of the appearance model, and a second portion of the scene being visualized using the second instance of the appearance model.

17. A device for generating a destination texture associated with a set of destination coordinates, the device comprising a processor and a memory comprising program instructions configured to cause the processor to carry out a method comprising:

i) assigning an interpolation weight to each of the source textures; and ii) synthesizing the destination texture using the source textures and the assigned interpolation weights, wherein synthesizing the destination texture comprises:

a) randomly choosing one of the source textures where probability of choosing a given source texture is proportional to its interpolation weight;

b) extracting a texture patch from the chosen source texture at a random position within the chosen source texture;

c) modifying the extracted texture patch by modifying pixel values in the extracted texture patch to obtain a modified texture patch, modification of the pixel values being carried out in such a manner that at least one statistical property of the modified texture patch approximates a corresponding averaged statistical property, the averaged statistical property being determined by carrying out a weighted average of the at least one statistical property over the source textures, weighted by the interpolation weights;

d) inserting the modified texture patch into the destination texture so that the modified texture patch seamlessly fits to existing texture content in the destination texture; and e) repeating steps a)-d) until the destination texture is completely filled.

18. The device of claim 17, further comprising a display device.

19. A computer program product comprising a non-volatile computer-readable medium on which program instructions are stored, wherein the program instructions which, when executed by a processor, cause the processor to carry out a method comprising:

i) assigning an interpolation weight to each of the source textures; and ii) synthesizing the destination texture using the source textures and the assigned interpolation weights, wherein synthesizing the destination texture comprises:

a) randomly choosing one of the source textures with where a probability of choosing a given source texture is proportional to its interpolation weight;

b) extracting a texture patch from the chosen source texture at a random position within the chosen source texture;

c) modifying the extracted texture patch by modifying pixel values in the extracted texture patch to obtain a modified texture patch, modification of the pixel values being carried out in such a manner that at least one statistical property of the modified texture patch approximates a corresponding averaged statistical property, the averaged statistical property being determined by carrying out a weighted average of the at least one statistical property over the source textures, weighted by the interpolation weights;

d) inserting the modified texture patch into the destination texture so that the modified texture patch seamlessly fits to existing texture content in the destination texture; and e) repeating steps a)-d) until the destination texture is completely filled.

* * * * *